United States Patent
Wendorff et al.

(10) Patent No.: US 9,702,103 B2
(45) Date of Patent: *Jul. 11, 2017

(54) SPREADER

(71) Applicant: Sno-Way International, Inc., Hartford, WI (US)

(72) Inventors: Terry C. Wendorff, Slinger, WI (US); Kevin J. Kuechler, Rubicon, WI (US); Robert N. Gamble, II, Watertown, WI (US); Jacob R. Brehmer, Jackson, WI (US)

(73) Assignee: Sno-Way International, Inc., Hartford, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,442

(22) Filed: Aug. 15, 2016

(65) Prior Publication Data
US 2016/0356011 A1 Dec. 8, 2016

Related U.S. Application Data

(63) Continuation-in-part of application No. 14/798,636, filed on Jul. 14, 2015, now Pat. No. 9,556,568.
(Continued)

(51) Int. Cl.
*E01C 19/20* (2006.01)
*E01C 19/12* (2006.01)
(Continued)

(52) U.S. Cl.
CPC ......... *E01H 10/007* (2013.01); *B65G 11/026* (2013.01); *B65G 11/083* (2013.01);
(Continued)

(58) Field of Classification Search
CPC ...... E01C 19/20; E01C 19/201; E01C 19/203; E01C 19/2035; E01C 19/204; E01C 2019/2065; E01C 2019/207; E01C 2019/208; E01H 10/007; B65G 11/026; B65G 11/083; B65G 11/206; B65G 31/04; B65G 33/10; B65G 2201/045
USPC ... 239/7, 665, 666, 668, 672, 674–681, 683, 239/687–689; 414/489, 507, 525.7, 526, 414/528
See application file for complete search history.

(56) References Cited

U.S. PATENT DOCUMENTS 3,559,894 A 2/1971 Murray et al.
3,768,737 A 10/1973 Tobias
(Continued)

FOREIGN PATENT DOCUMENTS

JP 2006-006113 A 1/2006
KR 2008/0070944 A 8/2008

*Primary Examiner* — Darren W Gorman
(74) *Attorney, Agent, or Firm* — Reinhart Boerner Van Deuren P.C.

(57) ABSTRACT

A hopper spreader for installation on a vehicle has a flow regulator configured to regulate flow of particulate material from the container. The spreader has a conveyor mechanism for conveying particulate material to a spinner that distributes the particulate material to the surface over which the vehicle moves. The spreader also includes a flow regulation mechanism located between the particulate material in the hopper and the conveyor mechanism which is configured to regulate flow of material from the hopper to the conveyor mechanism.

19 Claims, 45 Drawing Sheets

Related U.S. Application Data

(60) Provisional application No. 62/039,264, filed on Aug. 19, 2014, provisional application No. 62/027,014, filed on Jul. 21, 2014.

(51) Int. Cl.
*B65G 31/04* (2006.01)
*B65G 33/10* (2006.01)
*E01H 10/00* (2006.01)
*B65G 11/02* (2006.01)
*B65G 11/08* (2006.01)
*B65G 11/20* (2006.01)

(52) U.S. Cl.
CPC ............ *B65G 11/206* (2013.01); *B65G 31/04* (2013.01); *B65G 33/10* (2013.01); *E01C 19/203* (2013.01); *B65G 2201/045* (2013.01); *E01C 2019/208* (2013.01); *E01C 2019/2065* (2013.01)

(56) References Cited

U.S. PATENT DOCUMENTS

| | | | |
|---|---|---|---|
| 4,106,643 A * | 8/1978 | McGehee | A01C 15/00 |
| | | | 220/653 |
| 4,234,109 A * | 11/1980 | Goodhart | B60P 1/42 |
| | | | 222/609 |
| 4,852,809 A | 8/1989 | Davis et al. | |
| 5,549,347 A | 8/1996 | Anderson | |
| 6,422,490 B1 | 7/2002 | Truan et al. | |
| 6,702,208 B1 | 3/2004 | Hadler et al. | |
| 7,431,227 B2 | 10/2008 | Gamble, II et al. | |
| 7,543,765 B1 * | 6/2009 | Elling | E01C 19/201 |
| | | | 222/626 |
| 7,766,257 B2 | 8/2010 | Gamble, II et al. | |
| 8,262,004 B2 | 9/2012 | Gamble, II et al. | |
| 2006/0255189 A1 | 11/2006 | Niemela et al. | |
| 2007/0069044 A1 | 3/2007 | Sandler et al. | |
| 2013/0233938 A1 | 9/2013 | Norkus et al. | |
| 2014/0231553 A1 | 8/2014 | Truan et al. | |
| 2016/0017551 A1 | 1/2016 | Wendorff et al. | |

\* cited by examiner

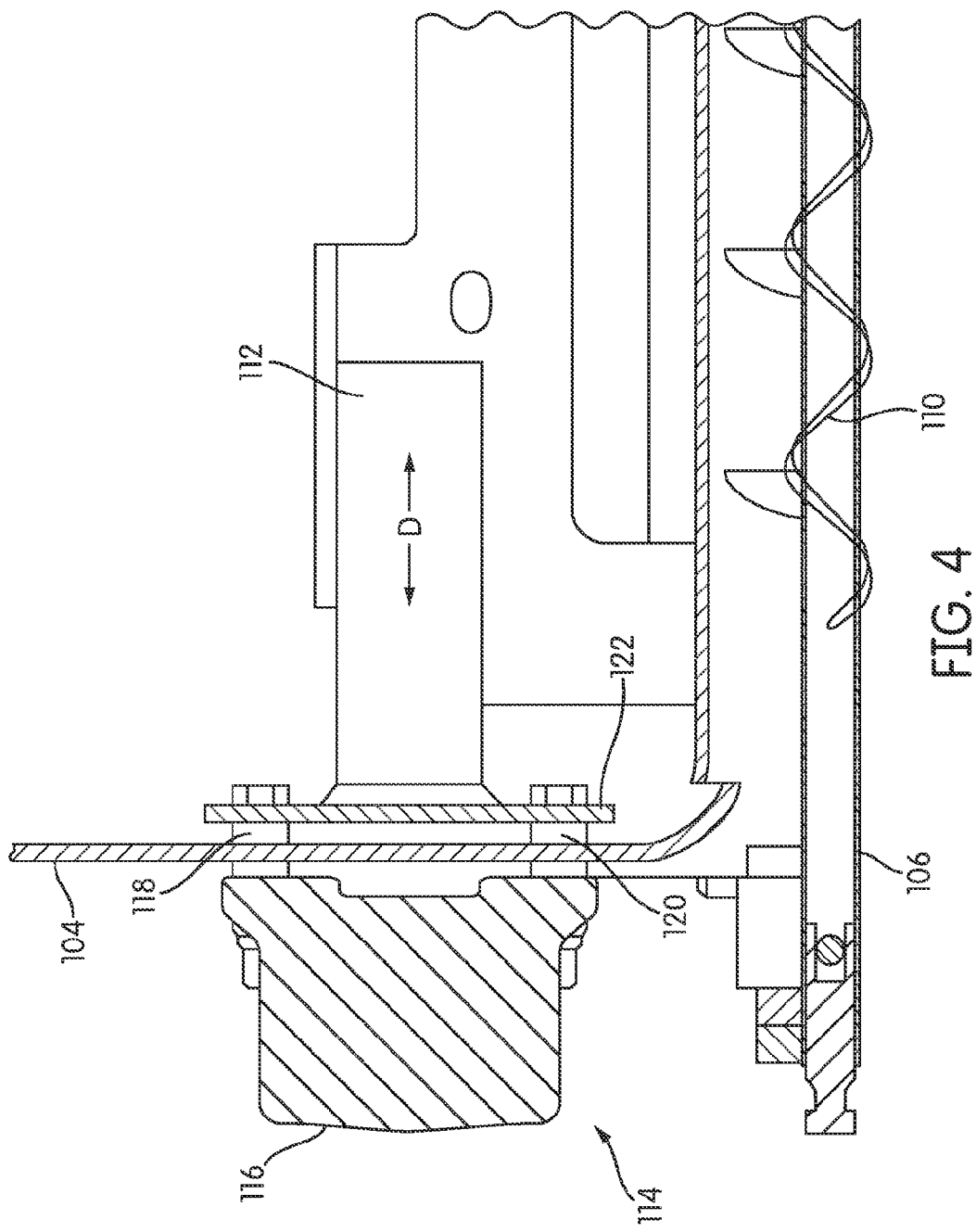

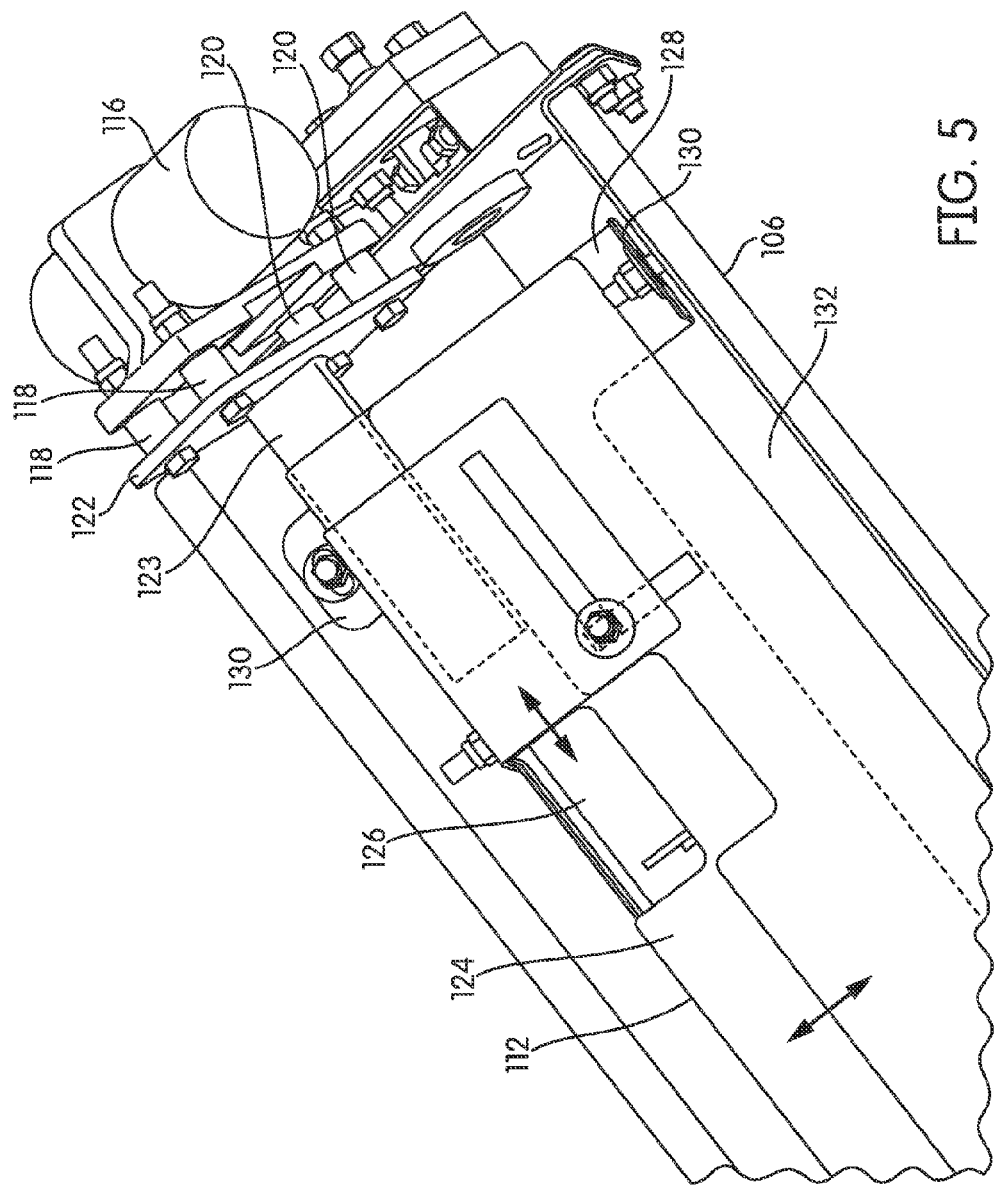

SPREADER

CROSS-REFERENCE TO RELATED PATENT APPLICATIONS

This patent application is a continuation-in-part of co-pending U.S. patent application Ser. No. 14/798,636, filed Jul. 14, 2015, which claims the benefit of U.S. Provisional Patent Application No. 62/027,014, filed Jul. 21, 2014; and U.S. Provisional Patent Application No. 62/039,264, filed Aug. 19, 2014, the entire teachings and disclosures of which are incorporated herein by reference thereto.

FIELD OF THE INVENTION

The present invention relates generally to hopper spreaders and more particularly to hopper spreaders having a flow regulator configured to regulate flow of particulate material from the container.

BACKGROUND OF THE INVENTION

The spreading of salt or other ice melters is a requirement in many areas for maintaining roads and driveways during the winter months. Various types of spreader units have been developed for spreading granular dry, free flow materials. Many such spreader units have been designed for mounting on vehicles such as trucks, either on the receiver of smaller trucks, or in the bed of larger commercial trucks that are used in wintertime road and driveway maintenance.

Spreaders generally hold a supply of granular material such as rock salt, flake (calcium 30 chloride), and/or bagged ice melters for distribution over a surface. Spreaders may be mounted in or on a vehicle which may be driven over the surface to be treated. The material moves from a hopper to a motor-driven spinner that distributes the material to the surface over which the vehicle moves.

Because salt spreaders are not used year round, they are generally removably mounted on the receiver of a truck, or, in the case of larger spreaders, in the bed of larger commercial trucks. In either event, sale spreaders have a discharge outlet at the bottom of the hopper through which the particulate material, such as salt, falls onto a spinner. The spinner that is rotated by a drive assembly including an electric or hydraulic motor that causes the spinner to spread the particulate material discharged from the hopper over a wide distribution area behind the truck. The speed of the spinner may typically be varied to control the size of the area over which the particulate material is distributed.

BRIEF SUMMARY OF THE INVENTION

With the present invention, a hopper spreader for installation on a vehicle has a flow regulator configured to regulate flow of particulate material from the container. The spreader has a conveyor mechanism for conveying particulate material to a spinner that distributes the particulate material to the surface over which the vehicle moves. The spreader also includes a flow regulation mechanism located between the particulate material in the hopper and the conveyor mechanism which is configured to regulate flow of material from the hopper to the conveyor mechanism.

In a first embodiment, a spreader configured to spread particulate material includes: a container configured to contain a quantity of dry, free flow particulate material, the container having an upper portion and a lower portion and being open on a top side of the upper portion, the container having a dispensing aperture located in the lower portion and one end thereof; a conveyor mechanism extending along a longitudinal axis in the lower portion of the container and extending adjacent the dispensing aperture; a baffle assembly mounted in the bottom portion of the container above the conveyor mechanism; a motor-driven spinner located near the discharge aperture for receiving particulate material discharged from the container and spreading the particulate material over a distribution area: and a flow regulator configured to regulate flow of particulate material from the container above the baffle past the baffle to the conveyor mechanism, the flow regulator being adjustable from a first configuration in which a flow path past the baffle having a first area is provided and a second configuration in which a flow path past the baffle having a second area is provided, the second area being smaller than the first area.

In second embodiment, a spreader configured to spread particulate material includes: a container configured to contain a quantity of dry, free flow particulate material, the container including a hopper open on a bottom side thereof and a trough mounted onto the bottom of the hopper, the trough having a dispensing aperture in a lower portion and at one end thereof; a motor-driven auger extending along a longitudinal axis in the lower portion of the container and configured to convey particulate material to the dispensing aperture; a baffle assembly mounted in the bottom portion of the container above the auger; a vibrator configured to vibrate the baffle assembly; a flow buffer located above the baffle assembly and over the dispensing aperture, wherein the flow buffer is configured to limit continuous flow downwardly past the baffle to the dispensing opening; a motor-driven spinner located near the discharge aperture for receiving particulate material discharged from the container and spreading the particulate material over a distribution area: and a flow regulator configured to regulate flow of particulate material from the container above the baffle past the baffle to the auger, the flow regulator being adjustable from a first configuration in which a flow path past the baffle having a first area is provided and a second configuration in which a flow path past the baffle having a second area is provided, the second area being smaller than the first area.

In third embodiment, a spreader configured to spread particulate material includes: a container configured to contain a quantity of dry, free flow particulate material, the container having a dispensing aperture located in the lower portion thereof; a conveyor mechanism located in the container and extending adjacent the dispensing aperture; a baffle assembly mounted in the container above the conveyor mechanism; a spinner located near the discharge aperture for receiving and spreading particulate material over a distribution area: and a flow regulator configured to regulate flow of particulate material from the container above the baffle past the baffle to the conveyor mechanism.

In a method embodiment, a method of operating a spreader configured to spread particulate material includes: loading a quantity of dry, free flow particulate material into a container having an upper portion and a lower portion and being open on a top side of the upper portion, the container having a dispensing aperture located in the lower portion and one end thereof; operating a conveyor mechanism extending along a longitudinal axis in the lower portion of the container to convey particulate material to the dispensing aperture; preventing the weight of the particulate material in the container from jamming the conveyor mechanism with a baffle assembly mounted in the bottom portion of the container above the conveyor mechanism; receiving particulate material discharged from the container and spreading the particulate material over a distribution area with a motor-driven spinner located near the discharge aperture: and regulating the flow of particulate material from the container above the baffle past the baffle to the conveyor mechanism with a flow regulator, the flow regulator being adjustable from a first configuration in which a flow path past the baffle having a first area is provided and a second configuration in which a flow path past the baffle having a second area is provided, the second area being smaller than the first area.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 4 is an illustration of a vibrator, hopper wall, inverted-v baffle, and auger shown schematically according to an exemplary embodiment;

FIG. 5 is an illustration of a spreader with a hopper removed for illustrative purposes according to an exemplary embodiment;

DETAILED DESCRIPTION OF THE INVENTION

Referring generally to the figures, various embodiments of a spreader are illustrated. In a preferred embodiment, the spreader is configured to be coupled to a vehicle, for example mounted in the bed of a truck. The spreader includes a storage container such as a hopper that is configured to hold material such as dry, free flow, granular or particulate material such as salt, sand, etc., for spreading over a surface. The spreader also includes a conveyor such as a screw conveyor or auger to move the granular material in the hopper toward a chute which directs the granular material to a spinner, which may distribute the granular material in an even and uniform flow pattern to the surface over which the vehicle travels.

In a preferred embodiment, the spreader uses a combination of a hopper, an auger, an isolated vibrating inverted V-shaped baffle, an inverted V baffle adjustment mechanism, an internal suppression baffle, and an internal directional flow baffles, to transfer spreading media from the hopper to the spinner and then to the surfaces below in an even and uniform flow pattern.

In a preferred embodiment, the structure of the spreader may be enhanced with horizontally established rings that encircle the hopper structure forming a band structure that gives the hopper vertical and horizontal structure, which may keep the walls of the hopper from bulging and failing under loaded conditions. Additionally the upper structure may be reinforced with metal support structures that act as tension members to hold the upper hopper in position, while at the same time acting as a support structure for the grid and a support structure for the hold down structures (i.e. brackets that straps use to attach the spreader to the bed of a truck). In yet another embodiment, the spreader may be prevented from moving from side to side in the bed of a truck by the addition of side support boards that can be easily integrated into the lower support structure.

To prevent the spreading media from being contaminated during transport, in one embodiment, a cover may be mounted on the hopper structure and stretched to conform to the upper hopper lip. The tubular structure inside the cover prevents the cover from coming off the hopper, while acting as a handle to remove and then roll back the cover for stowage. A series of straps and clamps may be used to loop into the grid structure and bind the cover to the spreader for transport when rolled up.

Figure 1:
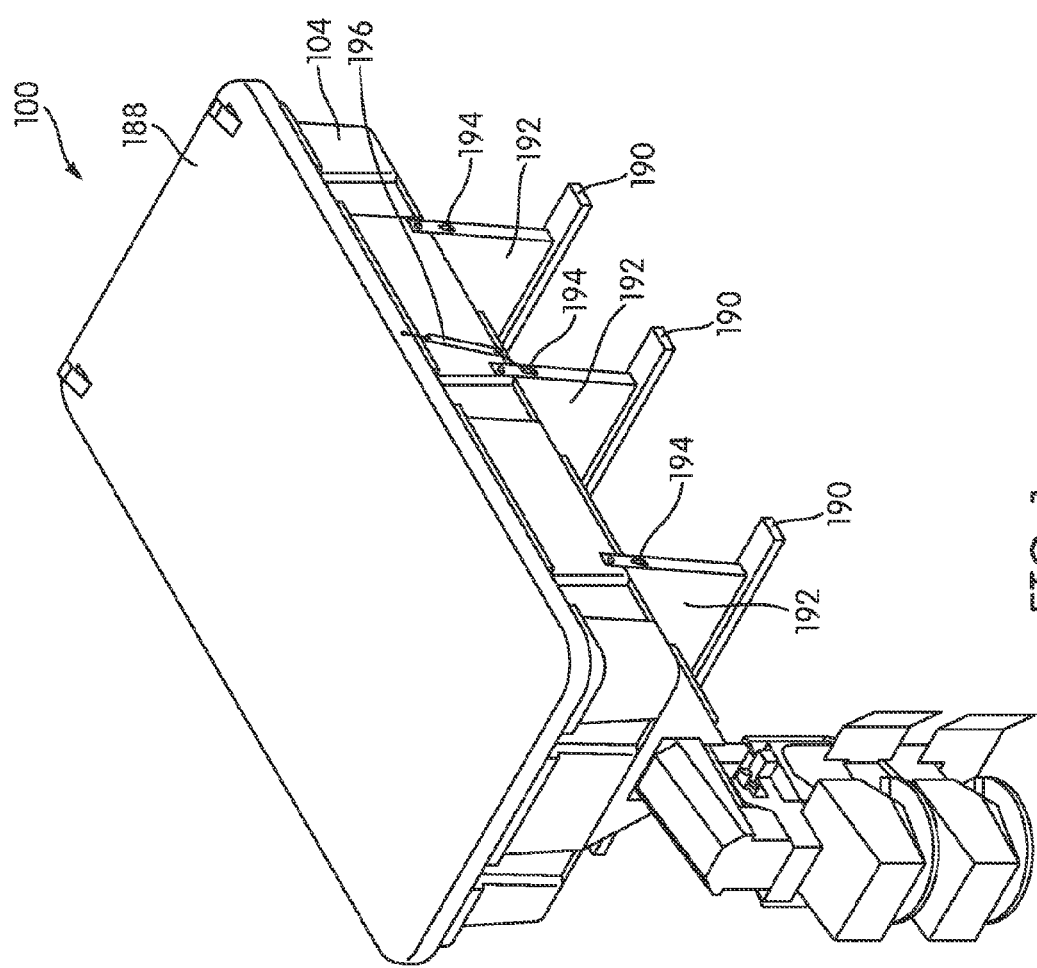
FIG. 1 is a perspective view of a spreader according to an exemplary embodiment.

With reference to FIG. 1, an embodiment of a spreader 100 is illustrated. The spreader 100 is configured to be coupled to a vehicle, typically in the bed of a pickup truck.

Figure 2:
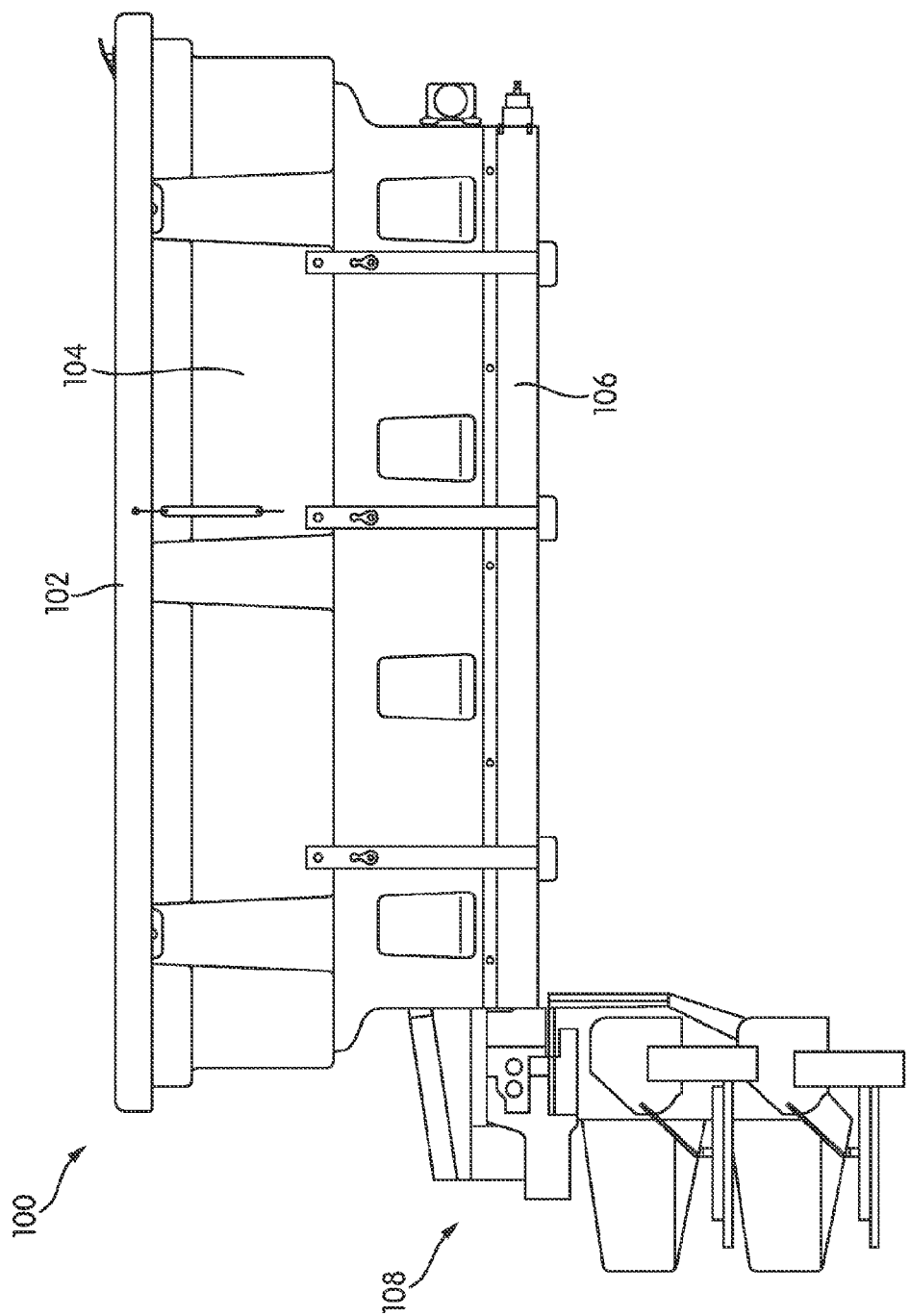
FIG. 2 is a side view of a spreader according to an exemplary embodiment.

FIG. 2 illustrates a side view of an embodiment of a spreader 100. The spreader includes a cover 102 configured to cover and prevent contamination of the contents of a storage hopper 104. Extending along the longitudinal axis and closing the lower end of the hopper 104 is a lower portion acting as a closure and referred to herein as a trough 106. The hopper 104 and the trough 106 together define a container in which the hopper 104 is an upper portion thereof and the trough 106 is a lower portion thereof. The hopper 104 includes a sidewall extending from a first end configured to be closed by the cover and a second end closed by the trough 106. At one end, the trough 106 defines a dispensing aperture configured to release the contents of the hopper 104 to a spinning assembly 108. The spinning assembly 108 has a motor-driven spinner located at the back of the spreader 100 for receiving particulate material discharged from the hopper 104 and spreading the particulate material over a distribution area.

Figure 3:
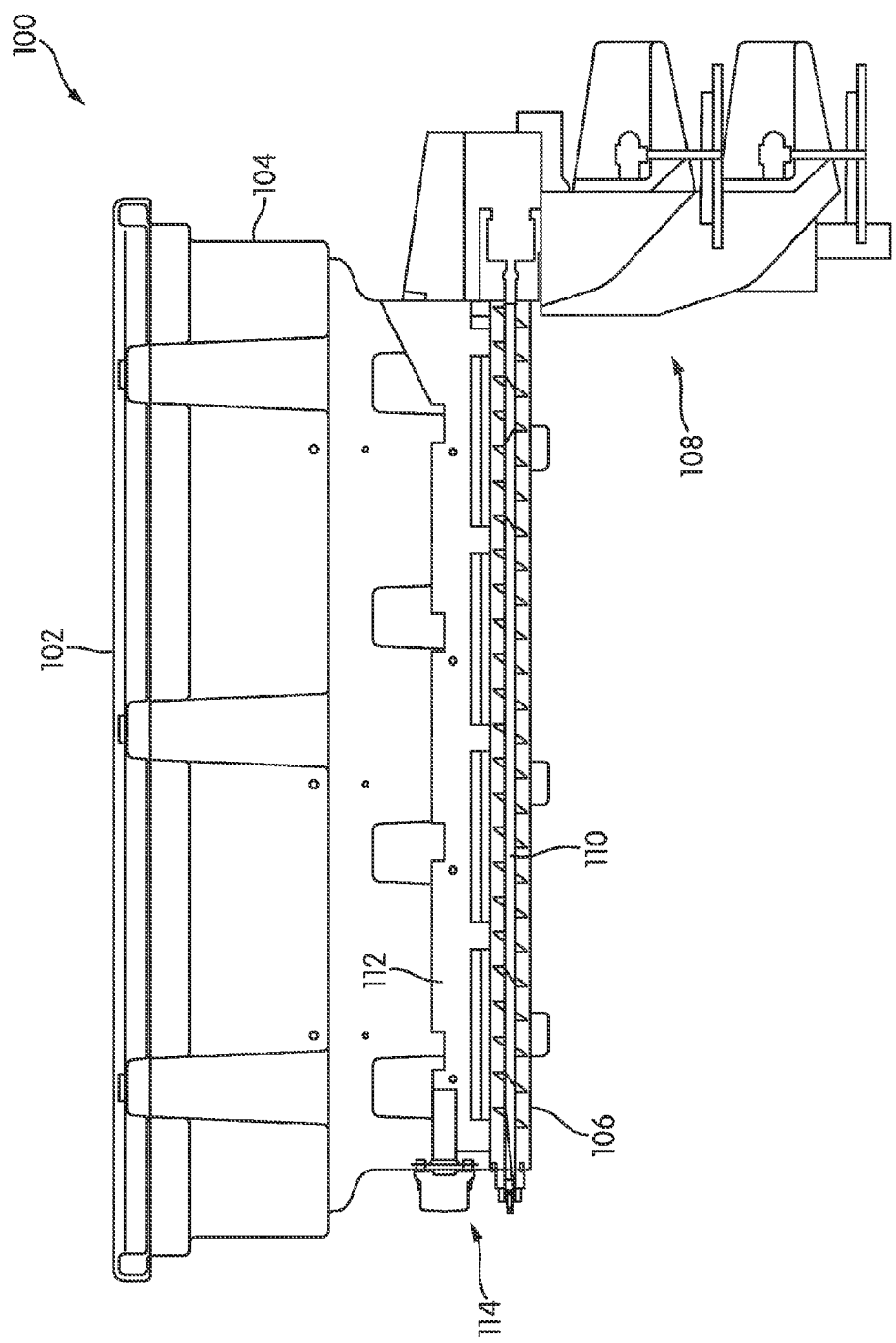
FIG. 3 is a cross-sectional view of a spreader according to an exemplary embodiment.

FIG. 3 is a cross-sectional view of an embodiment of the spreader 100. The spreader 100 includes a motor-driven conveyor, shown as an auger 110, extending along the longitudinal axis of the trough 106. In other embodiments, other suitable types of conveyors such as screw conveyors, chain drives, etc., may be used. The spreader 100 also includes a vibration transfer member, shown as a generally inverted V-shaped baffle 112 extending along the longitudinal axis of the hopper 104 above the auger 110. The V-shaped baffle 112 functions to prevent the weight of all of the particulate material in the hopper 104 from jamming the auger 110. The spreader 100 also includes a vibrator assembly 114 configured to vibrate as will be further described below. In other embodiments, the vibrator assembly 114 may be configured to vibrate the hopper 104 and/or the trough 106 instead of the inverted V-shaped baffle 112.

FIG. 4 is a detailed cross-sectional view of an embodiment of a spreader including the vibrator assembly 114 and the inverted V-shaped baffle 112. A vibrator 116 is coupled to the inverted V-shaped baffle 112 by four spacers, two of which are shown in FIG. 4 as upper isolation spacer 118 and lower isolation spacer 120. The spacers 118 and 120 pass through the wall of the hopper 104 and are coupled to an end plate 122 of the inverted V-shaped baffle 112 and support one end of the V-shaped baffle 112. In one embodiment, the isolation spacers 118 and 120 may promote vibration transfer to the inverted V-shaped baffle 112 and deter vibration transfer to the hopper 104.

With reference to FIG. 5, a tube structure shown as a transition portion 123 extends from the end plate 122 below the inverted V-shaped baffle 112 and supports the inverted V-shaped baffle 112. In one embodiment, the transition portion 123 is coupled to the inverted V-shaped baffle 112, such as, for example, by welding. In another embodiment, the transition portion 123 is configured to transfer load through a large area of the inverted V-shaped baffle 112, instead of the end of the V-shaped baffle 112 being welded directly to the end plate 122.

With further reference to FIG. 5, in one embodiment, the vibrator 116 may be configured to vibrate the V-shaped baffle 112 back and forth in a direction D (see FIG. 4) generally along the longitudinal axis of the hopper 104, for example generally parallel to the longitudinal axis of the auger 110. Thus, the vibrator 116 and the inverted V-shaped baffle 112 are isolated from the hopper 104 in the direction of movement of the inverted V-shaped baffle 112. In one embodiment, the inverted V-shaped baffle 112 is allowed to slide horizontally, for example, back and forth in the direction D, relative to the hopper 104 to facilitate maximum vibration effects from the vibrator 116.

In another embodiment, the vibrator 116 may be coupled to the hopper 104 and not directly connected to the inverted V-shaped baffle 112. In still another embodiment, the vibrator 116 may be coupled to the trough 106 and not directly connected to the inverted V-shaped baffle 112. In still another embodiment, multiple vibrators may be provided to provide additional vibration. In one embodiment, the opposite end of the inverted V-shaped baffle 112 proximate the discharge opening of the hopper 104 may be supported by extensions or support legs 128 with upturned ends 130 coupled, for example, by being bolted to the hopper 104.

In one embodiment, the vibrator 116 may be a rotational offset weight vibrator. In another embodiment, the vibrator 116 may be an electric vibrator. In still another embodiment, the vibrator 116 may be a hydraulic vibrator. In yet another embodiment, the vibrator 116 may be a pneumatic vibrator. In another embodiment, the vibrator 116 may be a vertical type vibrator. In yet another embodiment, the vibrator 116 may be an oscillating vibrator. In still other embodiments, other suitable types of vibrators may be used.

Figure 6:
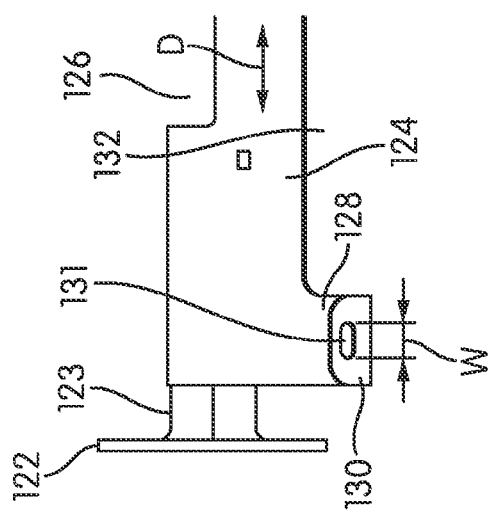
FIG. 6 is a side view of a central V-plate according to an exemplary embodiment.

With reference to FIGS. 5 and 6, in one embodiment, the inverted V-shaped baffle 112 is configured to provide a support structure for particulate material contained in the hopper 104, such that the weight of the particulate material does not weigh down the auger 110. The transition portion 123 extends from the end plate 122 to a central V-plate 124. The central V-plate 124 defines a plurality of upper apertures 126 spaced apart along the length of the central V-plate 124. The central V-plate 124 includes a plurality of support legs 128 longitudinally offset from the upper apertures 126 and extending from each side. The support legs 128 each include an upturned end 130. As illustrated in FIG. 6, the support legs 128 each include a slot 131. The slots 131 have a width W in the direction D greater than the diameter of bolts that passes through the slots 131 to couple the support legs 128 to the trough 106.

Figure 7:
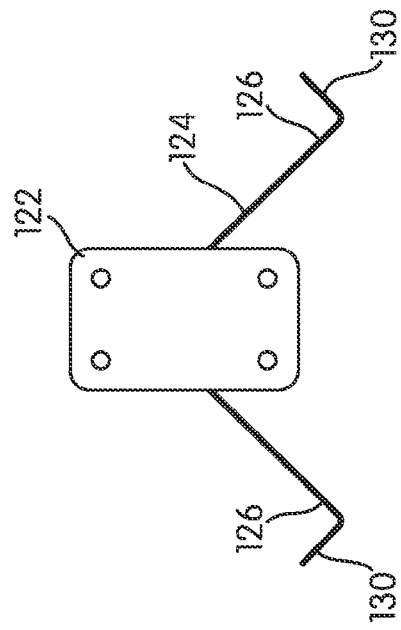
FIG. 7 is an end view of a central V-plate according to an exemplary embodiment.

With further reference to FIGS. 5 through 7, in one embodiment, the central V-plate 124 defines outer passages 132 between the support legs 128 configured to allow passage of particulate material between the central V-plate 124 and the hopper 104 and/or trough 106 to the auger 110 (not shown in FIGS. 5 and 6). The inverted V-shaped baffle 112 includes adjustment mechanisms configured to regulate the flow of particulate material from the hopper side of the inverted V-shaped baffle 112 down to the auger 110.

As will be described further below with reference to FIGS. 8 through 10, in one embodiment, the V-shaped baffle 112 includes flow regulation mechanisms configured to adjust the flow rate of particulate material from the hopper 104 past the inverted V-shaped baffle 112 toward the auger 100. The inverted V-shaped baffle 112 includes the central V-plate 124 defining a plurality of passages for particulate material to move past the central V-plate 124 to the auger 110. The central V-plate 124 defines upper apertures 126 spaced apart along the length of the central V-plate 124 and on the top thereof (at the apex of the V). With the central V-plate 124 coupled to the trough 106 (not shown in FIGS. 8 through 10) between the support legs 128, the central V-plate 124 and the trough 106 define a plurality of outer passages 132 configured to allow particulate material flow between the central V-plate 124 and the trough 106 past the V-shaped baffle 112 and down to the auger 110.

Figure 8:
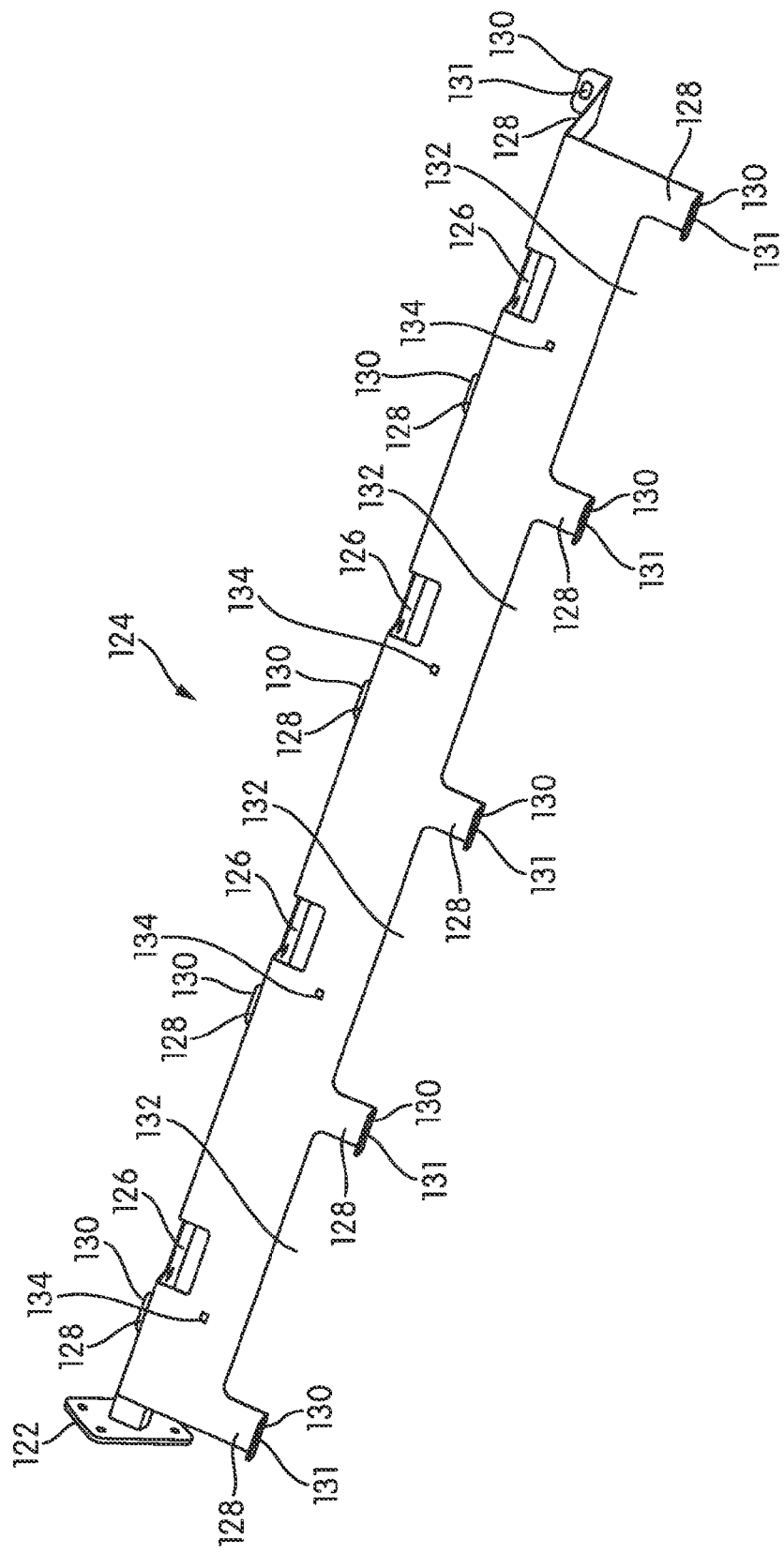
FIG. 8 is a perspective view of a central V-plate according to an exemplary embodiment.

With further reference to FIG. 8, in one embodiment, an aperture 134 is defined in the central V-plate 124 proximate each of the upper apertures 126. The apertures 134 are each configured to receive a portion of an adjustment control mechanism, e.g., a bolt of a nut and bolt pair, etc., configured to selectively prevent and allow adjustment of the flow regulation mechanisms to regulate the flow of particulate material past the inverted V-shaped baffle 112.

Figure 9:
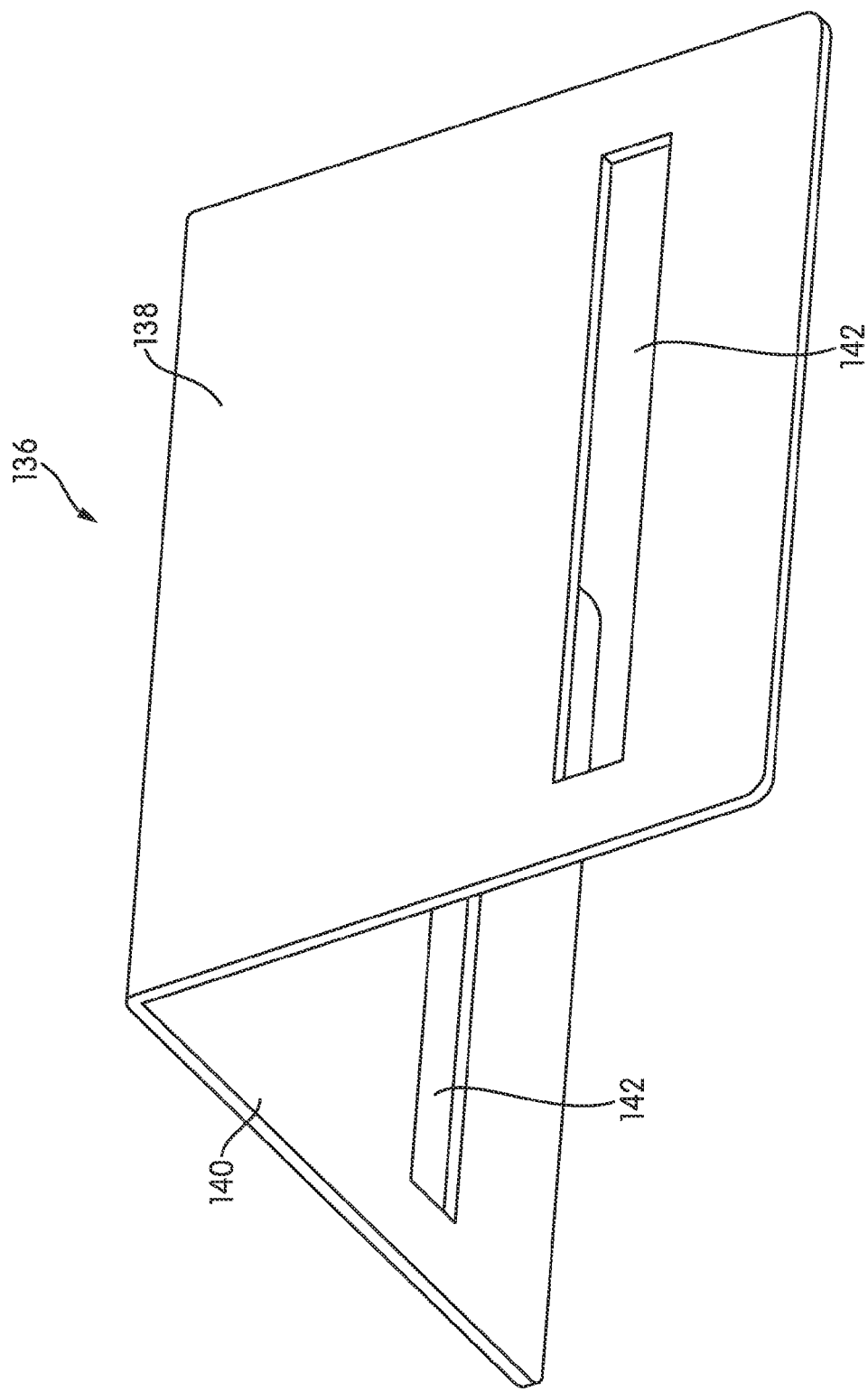
FIG. 9 is a perspective view of a flow regulation mechanism according to an exemplary embodiment.

With reference to FIG. 9, an embodiment of a flow regulation mechanism, illustrated as inverted V-shaped closure plate 136 is illustrated. The closure plate 136 includes a first leg 138 and a second leg 140. The first leg 138 and the second leg 140 extend at angles with respect to each other from a bend at an apex. A slotted track 142 extending generally in a direction parallel to the auger 110 is defined in each of the legs 138 and 140. With reference to FIG. 10, the closure plates 136 are configured to be coupled to the central V-plate 124 by an adjustment control mechanism, shown in the drawings as a nut and bolt pair 144, with the bolt passing through each of the tracks 142 and through a respective aperture 134. Those skilled in the art will realize that other adjustment control mechanisms could instead be used, such as, for example, threaded apertures 134 and a bolt. In the configuration illustrated in FIG. 10, the closure plates 136 are each configured to block an upper aperture 126 (not visible in FIG. 10), thereby preventing particle material flow therethrough. In the configuration illustrated in FIG. 10, particulate material may always flow through the passages 132 past the inverted V-shaped baffle 112.

Under various conditions, such as, for example, an increase in the moisture content of the particulate material, it may be desirable to allow additional particulate material to move past the inverted V-shaped baffle 112. In the embodiment shown, the adjustment control mechanism may be adjusted to allow adjustment of the flow regulation mechanisms to allow additional particulate material flow by loosening the nut and bolt pairs 144 to allow the closure plates 136 to be moved from the first, closed position shown in FIG. 10 to a second partially open configuration shown in FIG. 11. The closure plates 136 may be moved relative to the central V-plate 124 to allow particulate material to flow through a selected portion (from none to all) of each of the upper apertures 126. One or more of the closure plates 136 may be adjusted to control the flow rate of the particulate material. With the closure plates 136 in selected positions relative to the central V-plate 124, the adjustment control mechanisms, e.g., the nut and bolt pairs 144, may be adjusted to fix the closure plates 136 in their desired positions relative to the central V-plate 124.

Figure 11:
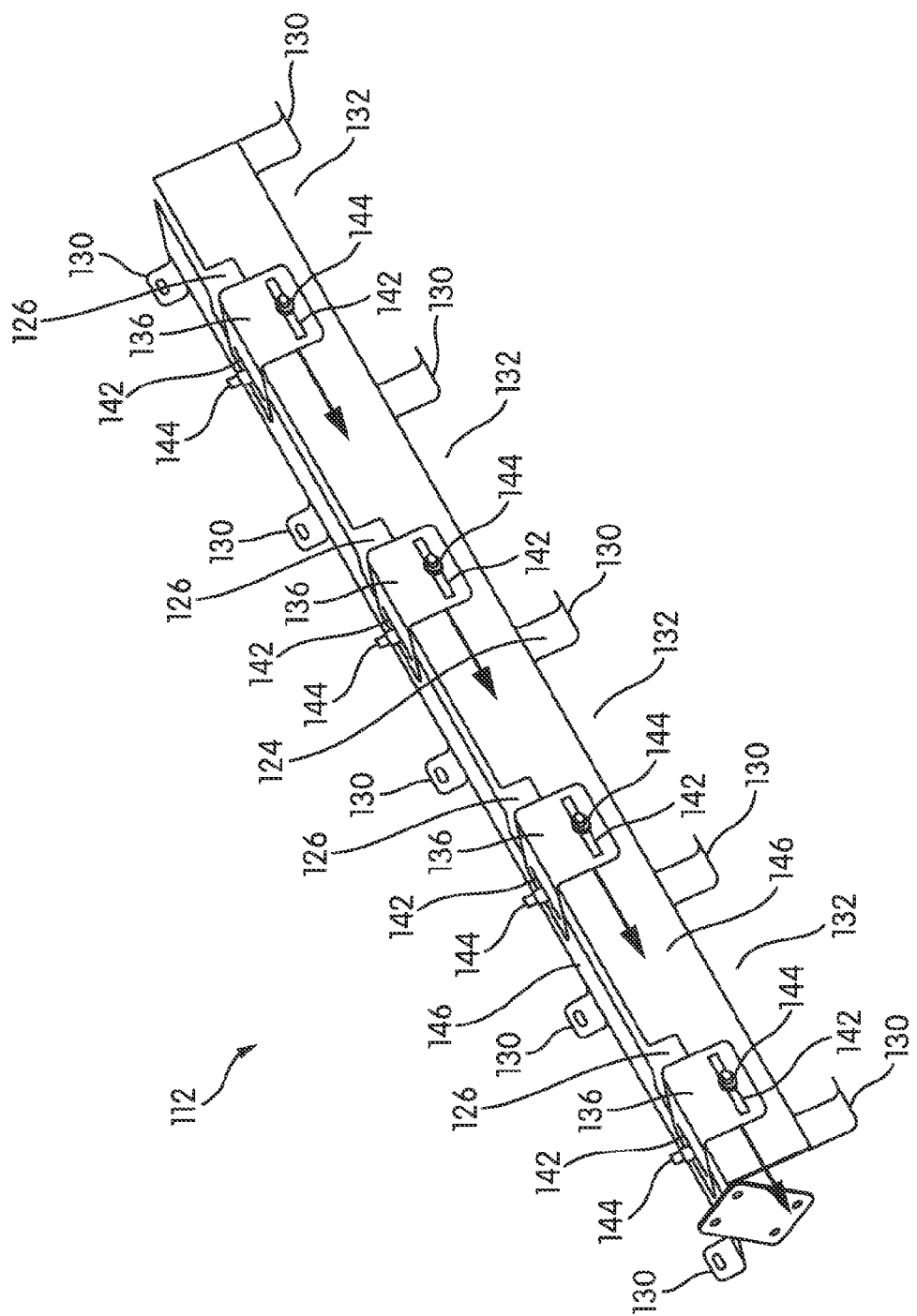
FIG. 11 is a perspective view of an inverted V-shaped baffle according to an exemplary embodiment.
Figure 12:
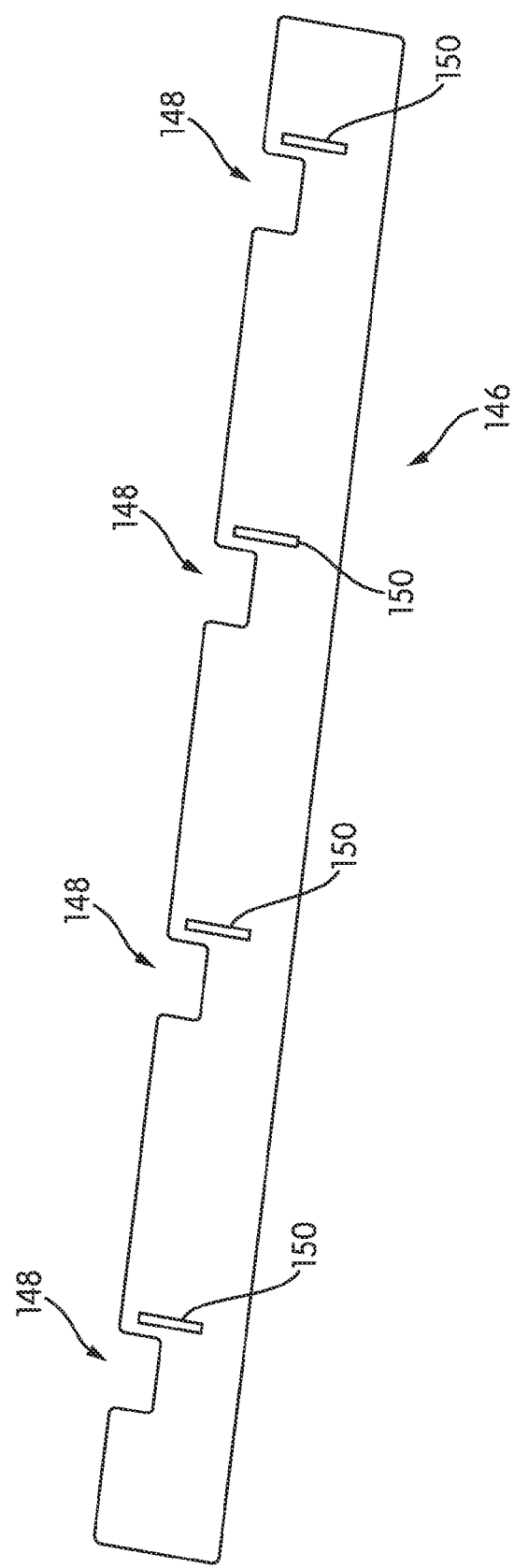
FIG. 12 is a side view of a flow regulation mechanism according to an exemplary embodiment.

With reference to FIG. 12, in another embodiment, the inverted V-shaped baffle 112 (not shown in FIG. 12) may include a pair of side plates 146 (one of which is shown in FIG. 12, the other being a mirror image thereof). The upper periphery of the side plates 146 includes generally U-shaped recessed portions 148. The recessed portions 148 are configured such that the side plates 146 do not obstruct the upper apertures 126 when the side plates 146 are coupled to the central V-plate 124. The side plates 146 also include slotted tracks 150 defined in each of the side plates 146 proximate each of the recessed portions 148. The tracks 150 are configured to interact with the adjustment control mechanism, for example, the bolt of the nut and bolt pair 144 (shown in FIG. 11), to couple the side plate 146 to the central V-plate 124.

Figure 10:
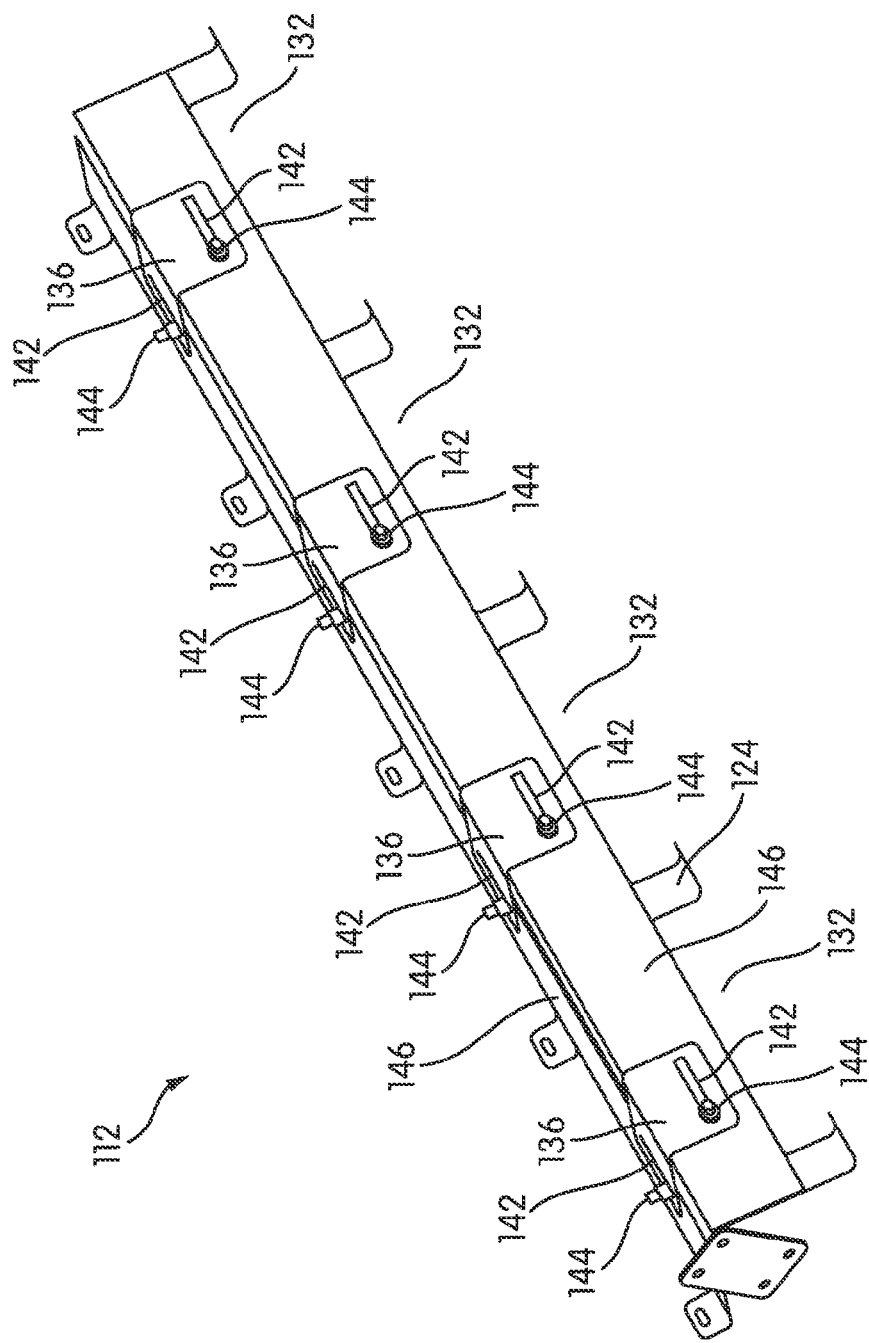
FIG. 10 is a perspective view of an inverted V-shaped baffle according to an exemplary embodiment.
Figure 13:
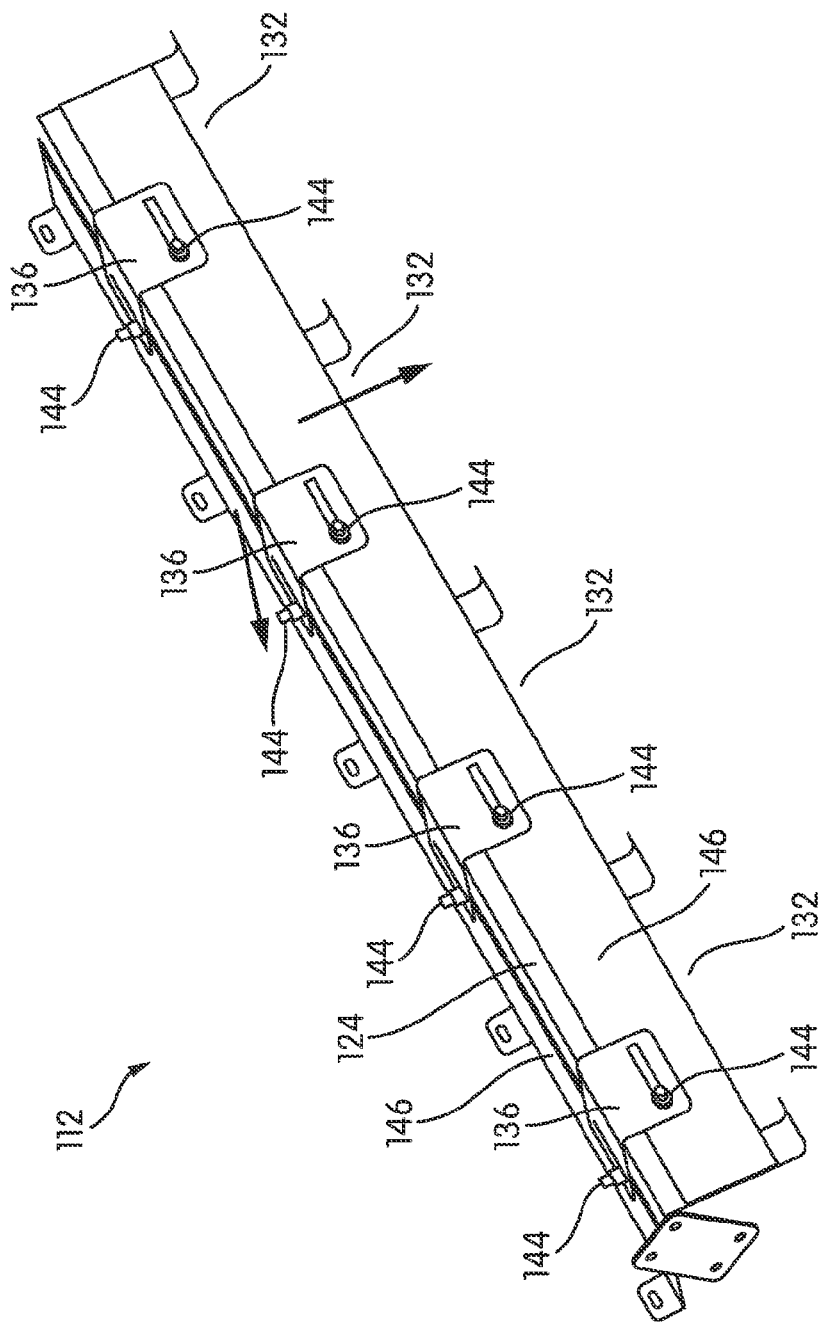
FIG. 13 is a perspective view of an inverted V-shaped baffle according to an exemplary embodiment.

With reference to the embodiment shown in FIG. 10, the side plates 146 are coupled on opposite sides of the central V-plate 124 and are each located between the closure plates 136 and the central V-plate 124 with the bolts of the nut and bolt pairs 144 passing through the tracks 150 (not visible in FIG. 10). With the adjustment control mechanisms configured to allow adjustment of the side plates 146, the side plates 146 can each be moved between a first position, illustrated in FIG. 10, and a second position, illustrated in FIG. 13. The side plates 146 may be moved downwardly toward the upturned ends 130 to block and/or cover a portion of the outer passages 132 to reduce the size of the outer passages 132 and reduce the flow of particulate material therethrough. When the side plates 146 are located in position to size the outer passages 132 to the desired size, the adjustment control mechanism can be operated to prevent adjustment of the side plates 146, whereby the nut and bolt pairs 144 can be adjusted to fix the position of the side plates 146 with respect to the central V-plate 124.

In the embodiment shown, the closure plates 136 and the side plates 146 are all independently adjustable to provide control of the flow of particulate material. In another embodiment, an adjustment control mechanism may include a controller configured to receive information regarding conditions, e.g., conditions to which the particulate material in the hopper 104 are subjected, such as temperature, moisture content, flow speed, material level in the hopper, etc., and to use this information to adjust the flow regulation mechanisms based on the conditions to regulate particulate material flow. In another embodiment, controllers and/or methods described herein may be implemented in software operating the system. In yet another embodiment, controllers and/or methods described herein may be implemented in a combination of computer hardware and software. In various other embodiments, systems implementing controllers discussed herein may include one or more processing components, one or more computer memory components, and one or more communication components.

In various embodiments, the processing components may include a general purpose processor, an application specific integrated circuit ("ASIC"), a circuit containing one or more processing components, a group of distributed processing components, a group of distributed computers configured for processing, etc., configured to provide the functionality of the controllers discussed herein. In various embodiments, controllers may be implemented using microprocessors. In various embodiments, memory components may include one or more devices for storing data and/or computer code for completing and/or facilitating the various processes described in the present disclosure, and may include database components, object code components, script components, and/or any other type of information structure for supporting the various activities described in the present disclosure. In various embodiments, the communication component may include hardware and software for communicating data, e.g., condition data from sensors to controllers, for the system and methods discussed herein.

For example, communication components may include, wires, jacks, interfaces, wireless communications hardware, etc., for receiving and transmitting information as discussed herein. In various specific embodiments, controllers and/or methods described herein, may be embodied in nontransitory, computer readable media, including instructions (e.g., computer coded) for providing the various functions and performing the various steps discussed herein. In various embodiments, the computer code may include object code, program code, compiled code, script code, executable code, instructions, programmed instructions, non-transitory programmed instructions, or any combination thereof. In other embodiments, controllers described herein may be implemented by any other suitable method or mechanism.

Figure 14:
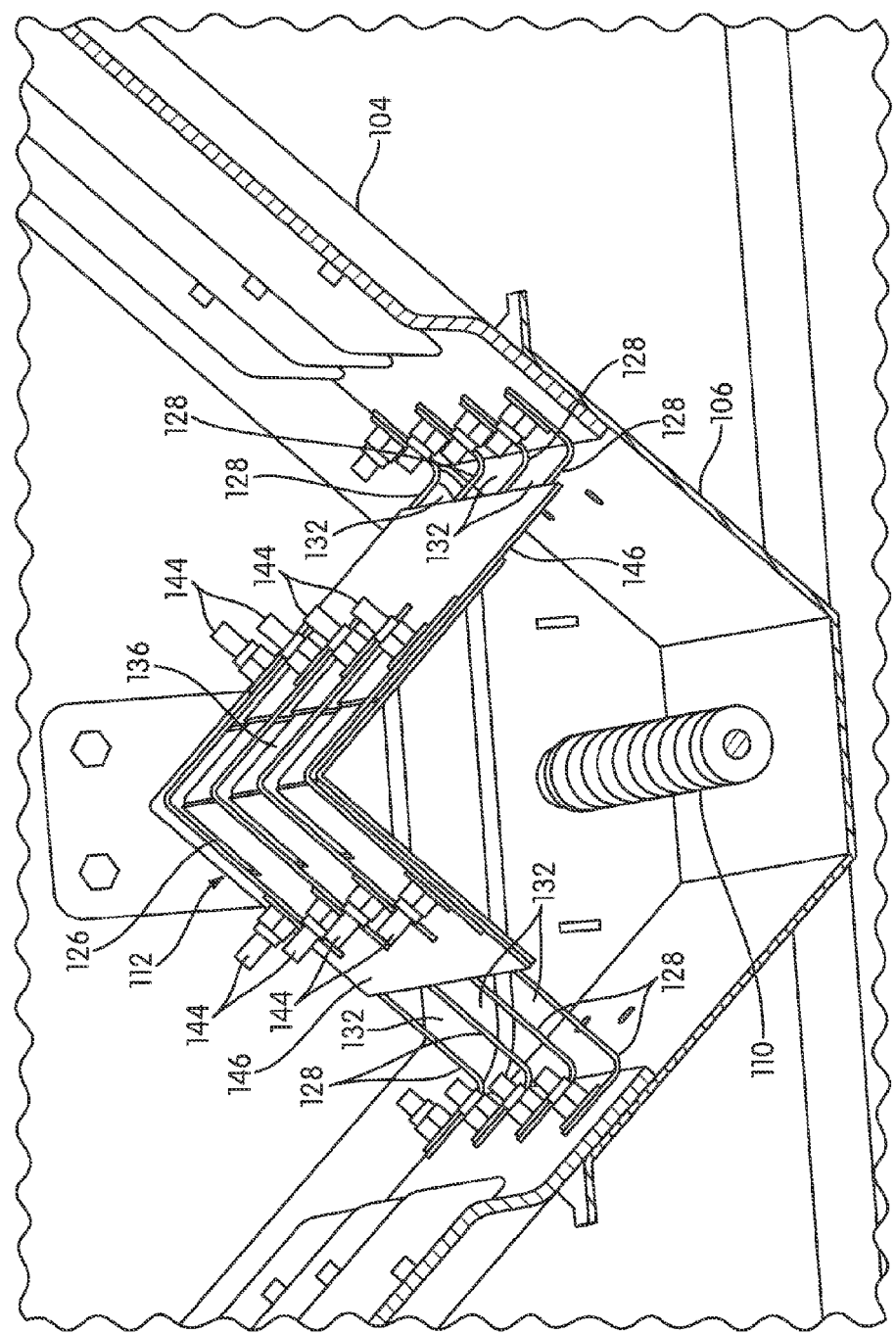
FIG. 14 is a cross-sectional view of a spreader according to an exemplary embodiment.

With reference to the embodiment shown in FIG. 14, the sideplates 146 can be moved independently of each other. The sideplate 146 located on the right in FIG. 14 is shown in the lower configuration blocking and/or covering a portion of the outer passages 132 on the right side, while the sideplate 146 located on the left in FIG. 14 is shown in the upper configuration with the outer passages on the left unobstructed. In another embodiment, sideplates 146 may instead be moved angularly, e.g., in a direction non-parallel to the longitudinal axis of the auger 110, to provide for differential flow past the inverted V-shaped baffle 112, for example providing more gap and more flow proximate the discharge opening of the hopper 104 than proximate the rear and/or bearing side, which is in the embodiments shown herein proximate the vibrator 116.

Figure 15:
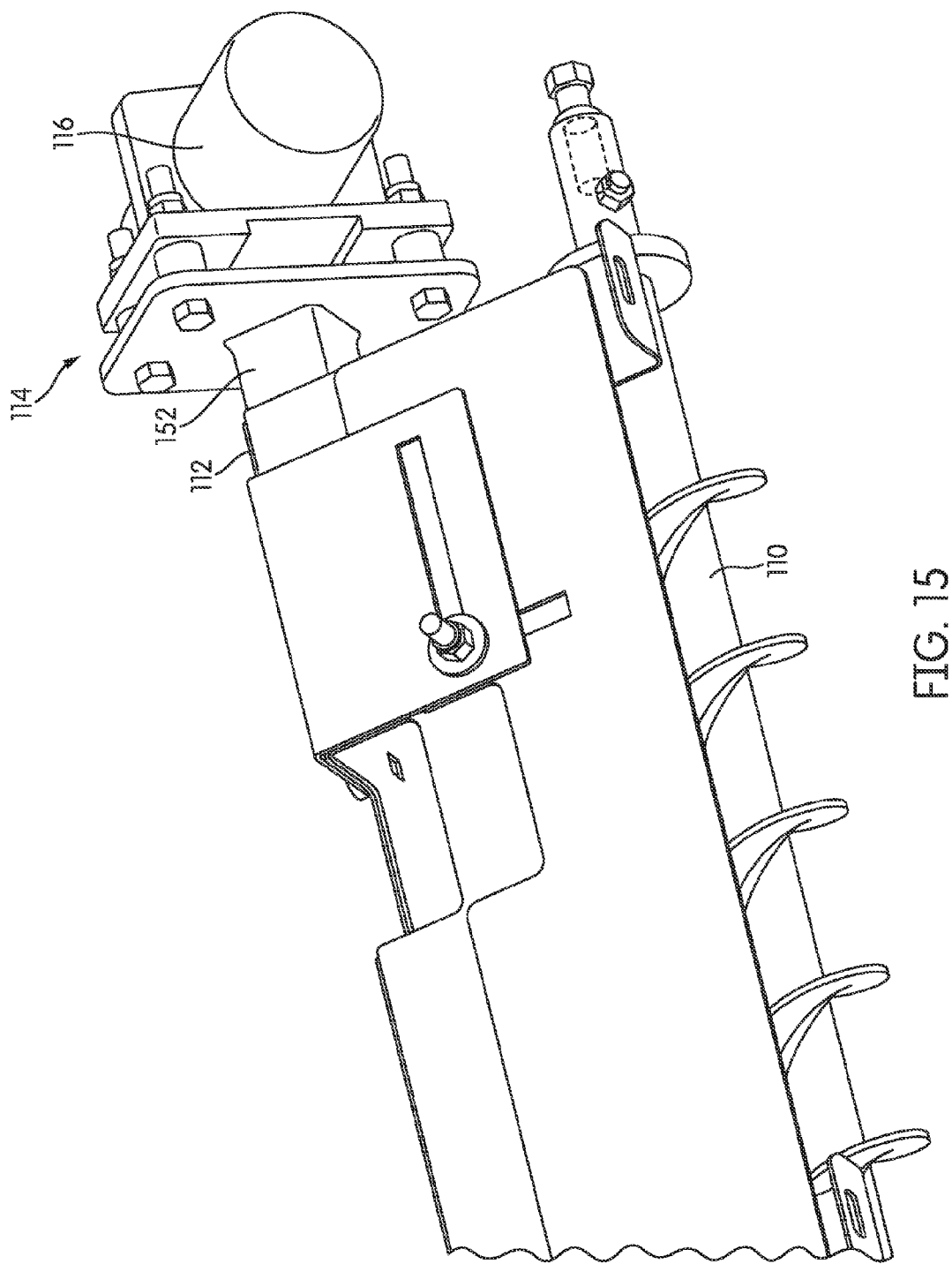
FIG. 15 is an illustration of a portion of an inverted V-shaped baffle, vibrator, and auger shown schematically according to an exemplary embodiment.

With reference to the embodiment shown in FIG. 15, a support 152 located at one end of the inverted V-shaped baffle 112 supports it vertically at that end. In another embodiment, the inverted V-shaped baffle 112 may be allowed to move by sliding in a direction parallel to the longitudinal axis along which the auger 110 extends.

Figure 16:
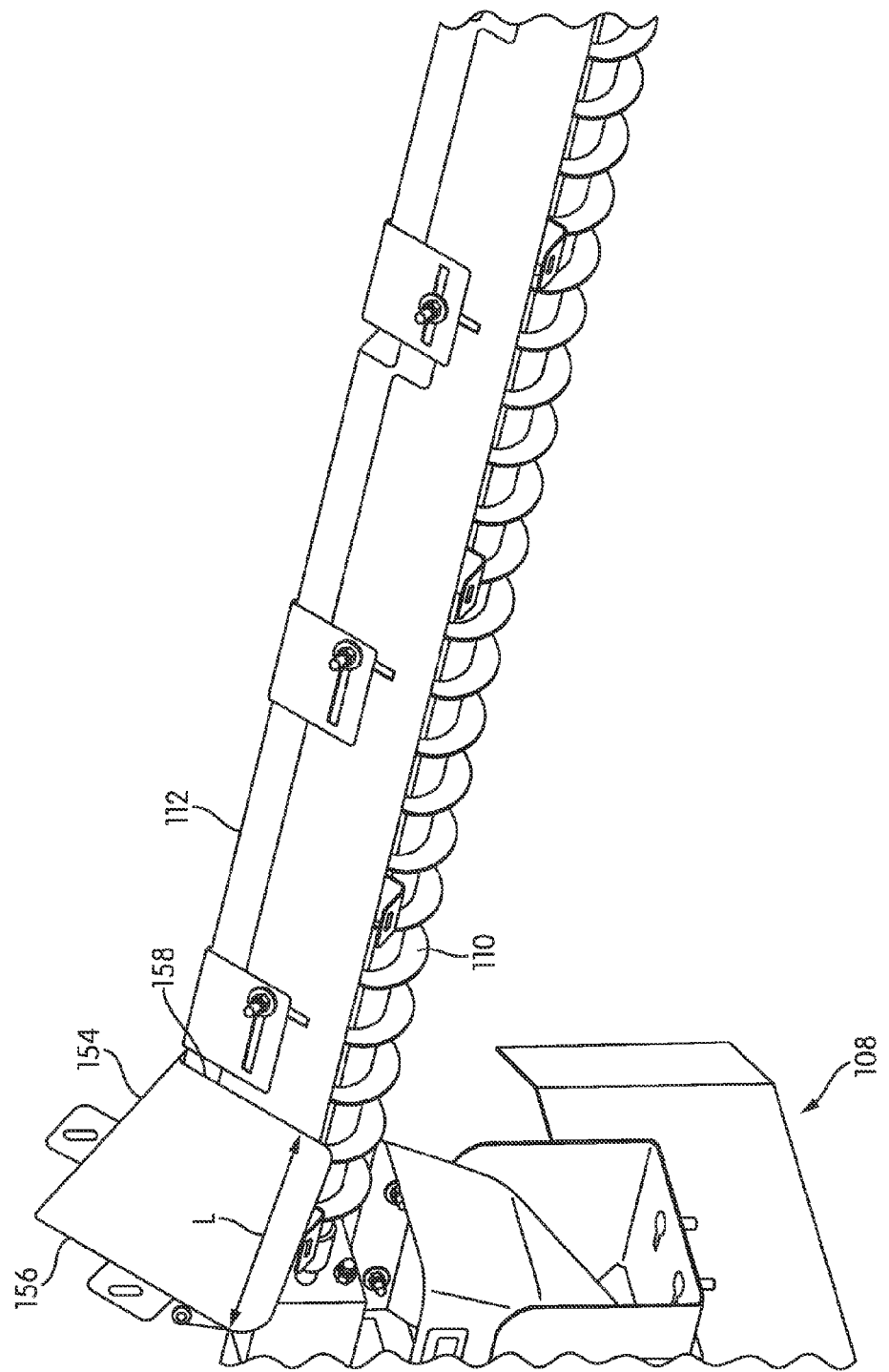
FIG. 16 is a view illustrating a flow buffer according to an exemplary embodiment.

With reference to the embodiment shown in FIG. 16, the inverted V-shaped baffle 112 has a second (opposite) end proximate the spinning assembly 108 at the discharge end. Referring for the moment to FIG. 3, the trough 106 defines a dispensing aperture proximate the spinning assembly 108 through which particulate material falls from the trough 106 into the spinning assembly 108. Similarly to the first end of the inverted V-shaped baffle 112, there may optionally be a gap between the second end of the central V-plate of the inverted V-shaped baffle 112 and the hopper 104 (not shown in FIG. 16). Such a gap would be located above the dispensing aperture. However, it may be undesirable for particulate material to have a path to freely flow past the inverted V-shaped baffle 112 and directly through to the dispensing opening to the spinner 108. For example, the discharge opening may become gated or partially blocked during transport of the spreader 100 to the location at which it is to be used.

Figure 16A:
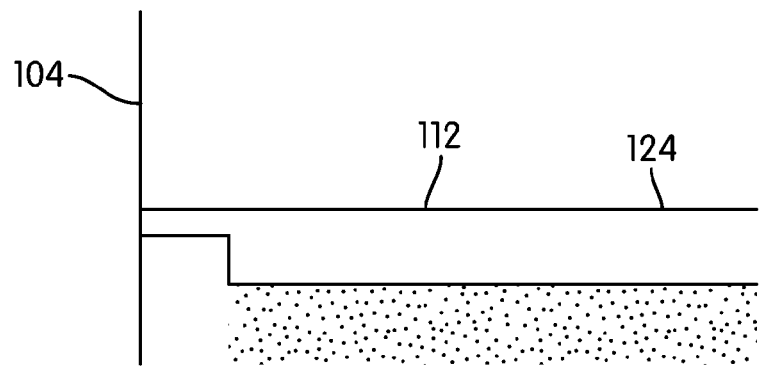
FIG. 16A is a view of an inverted V-shaped baffle and a hopper wall shown schematically according to an exemplary embodiment.

Particulate material may have an angle of spillage or flow incidence, in one embodiment from between approximately 40-45 degrees to horizontal. When the driving of the flow of particulate material by the auger 110 is stopped, some of the material may continue to flow out through the dispensing opening of the spreader. In the embodiment shown in FIG. 16, a flow buffer 154 is provided to prevent particulate material from tending to continue to flow. Referring for the moment to FIG. 16A, without the flow buffer 154, even after driving of the flow of particulate material by the auger 110 has stopped, particulate material can flow between the central V-plate 124 and the hopper 104 directly downwardly to the dispensing opening, which may be undesirable.

Figure 16B:
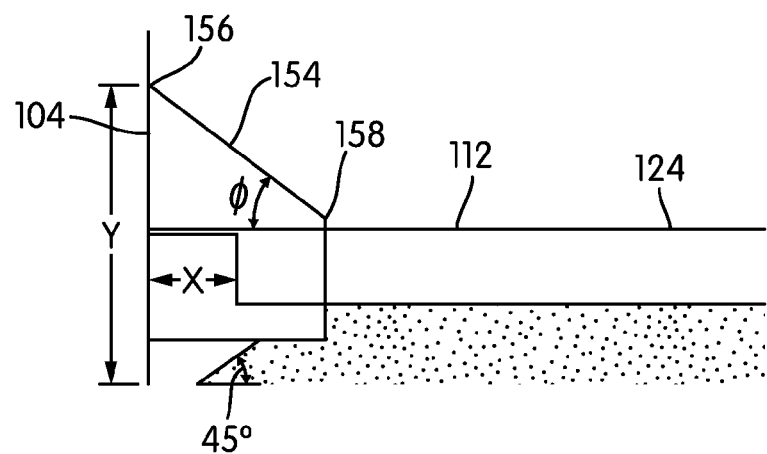
FIG. 16B is a view of an inverted V-shaped baffle, a flow buffer, and a hopper wall shown schematically according to an exemplary embodiment.

Referring again for FIG. 16B in addition to FIG. 16, it may be seen that the flow buffer 154 extends a distance greater than the distance of a gap X, preventing particulate material from flowing downwardly through the gap X. Thus, when the driving force is stopped and the angle of spillage or flow incidence of the surface of particulate material below the inverted V-shaped baffle 112 is moved away from the dispensing opening, the flow of particulate material will stop and not continue flowing to the dispensing opening. Optionally, an angle T of the surface of the flow buffer 154 relative to horizontal may be increased to increase particulate material flow. Instead or additionally, a height Y of the flow buffer 154 can be adjusted. Also instead or additionally, the distance the flow buffer 154 extends in generally the same direction as distance X may be adjusted. Another option is to allow the inverted V-shaped baffle 112 to slide in the direction of the longitudinal axis of the auger relative to the flow buffer 154, such that the flow buffer 154 is not coupled to the inverted V-shaped baffle 112.

Referring again to FIG. 16, the flow buffer 154 thereby prevents particulate material from flowing directly past the inverted V-shaped baffle 112 between the second end of the inverted V-shaped baffle 112 and the hopper 104 to the dispensing opening. The flow buffer 154 includes two legs extending downwardly from an apex. In one embodiment, a first end 156 of the flow buffer 154 is coupled to the hopper 104. A second end 158 of the flow buffer 154 is supported on the inverted V-shaped baffle 112. Each of the legs is taller near the first end 156 and tapers, e.g., decreases in height in the direction toward the second end 158. Thus, the flow buffer 154 is sloped to direct particulate material away from the dispensing opening. Optionally, the flow buffer 154 may be configured to create a relief from side flow and allow only movement of the auger 110 to move the particulate material. Also optionally, the flow buffer 154 may be configured to prevent continued particulate material flow when the auger 110 is stopped, such as when the spreader is in transit.

Figure 17:
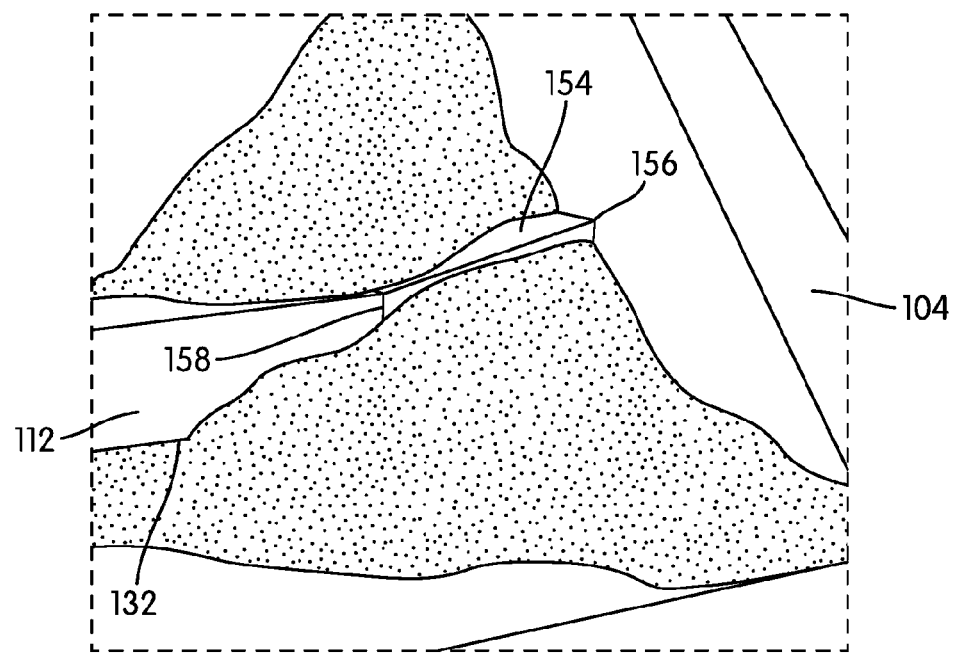
FIG. 17 is a view of particulate material, an inverted V-shaped baffle, and a flow buffer according to an exemplary embodiment.
Figure 17A:
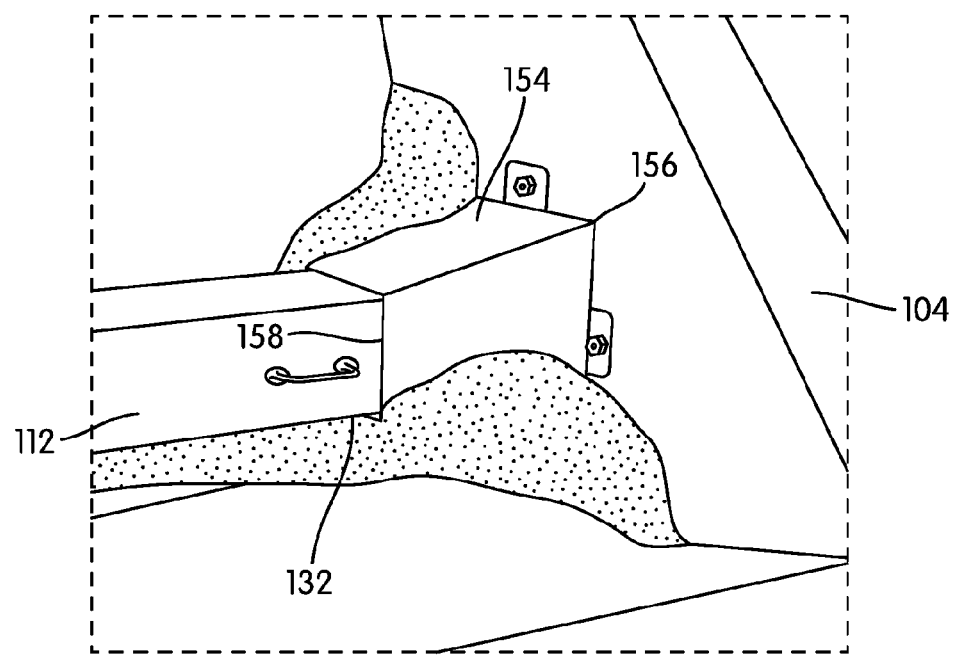
FIG. 17A is a view of particulate material, an inverted V-shaped baffle, and a flow buffer according to an exemplary embodiment.

Referring now to FIGS. 17 and 17A, it will be appreciated that the legs of the flow buffer 154 may also block and/or cover a portion of the outer passages 132 proximate the dispensing opening. Particulate material is thereby prevented from flowing downwardly in the area covered by the flow buffer 154, and instead flows around the sides of the second end 158 of the flow buffer 154. Thus, when the auger 110 is rotating, particulate material is pulled toward the dispensing opening in a direction generally parallel to the longitudinal axis of the auger, e.g., not directly downwardly past the inverted V-shaped baffle 112 and straight to the dispensing opening. When rotation of the auger 110 is stopped, the flow buffer 154 will thus prevent continued particulate material flow.

Optionally, the flow buffer 154 may be adjusted to change its height. Also optionally, the flow buffer 154 may be adjusted to change its angle of slope from its first end 156 to its second end 158. The flow buffer 154 extends a length L in a direction parallel to the longitudinal axis of the auger 110. Optionally, the flow buffer 154 may be configured to be adjustable to change the length of the flow buffer 154 in a direction parallel to the longitudinal axis of the auger 110. Also optionally, the length and/or the height and/or the angle of the flow buffer 154 can be adjusted by remote control, e.g., moved by an electric motor, hydraulics, etc., and controlled by a controller located outside of the spreader. As a further optional embellishment, the baffle may be adjusted automatically with a computer or a simple mechanical control medium, for example with a temperature sensitive spring, a moisture sensitive circuit, a particulate material level sensing circuit, etc.

Figure 17B:
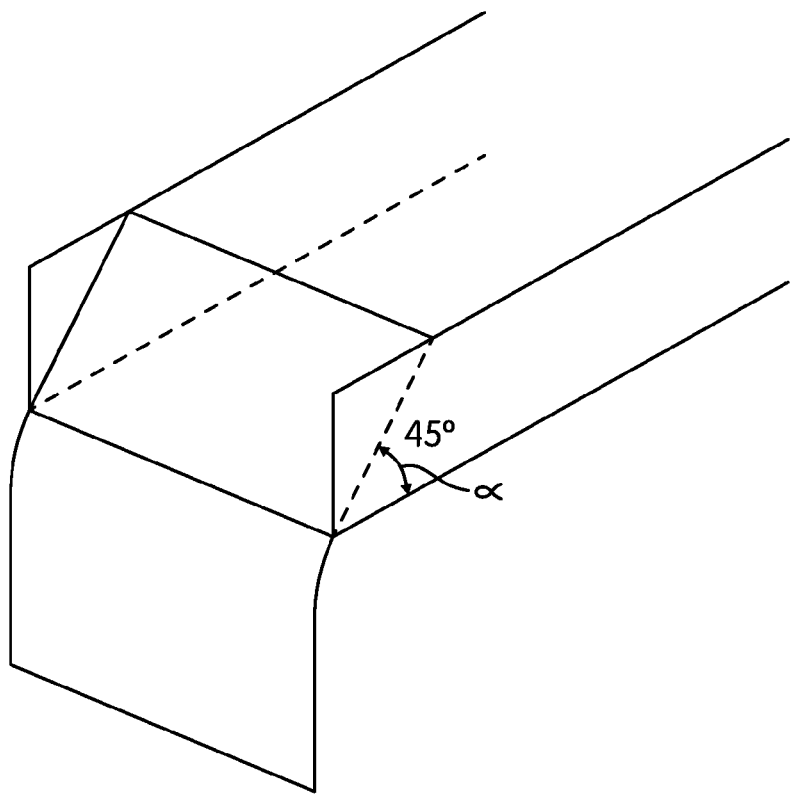
FIG. 17B is an exemplary view illustrating falling material schematically.
Figure 17C:
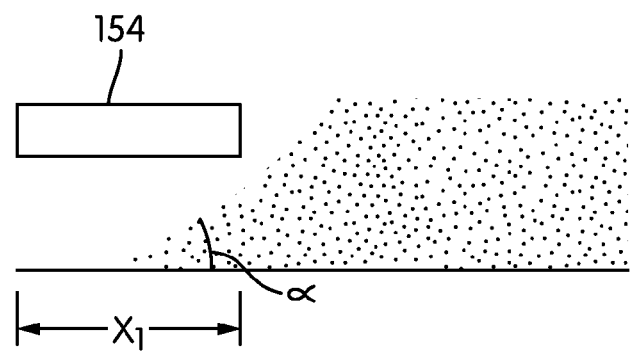
FIG. 17C is a view of a flow buffer shown schematically according to an exemplary embodiment.
Figure 17D:
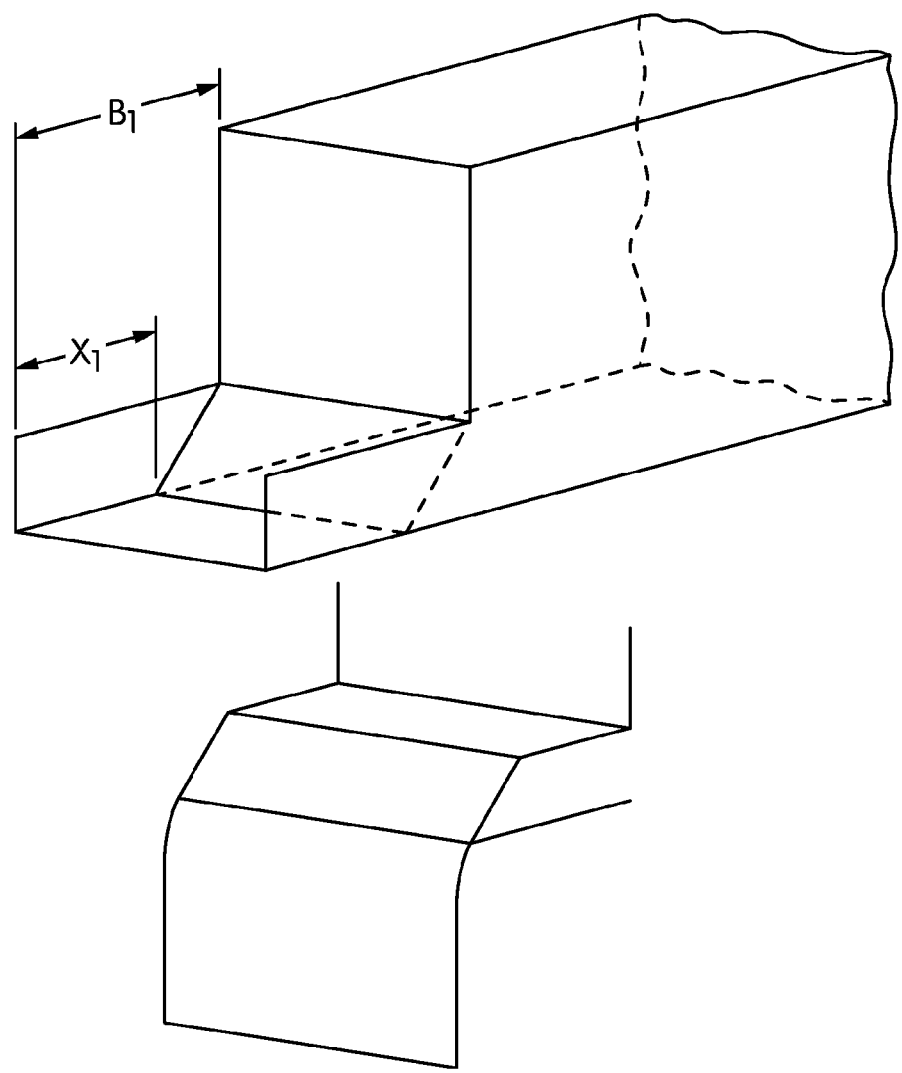
FIG. 17D is a view illustrating a flow buffer schematically according to an exemplary embodiment.
Figure 17E:
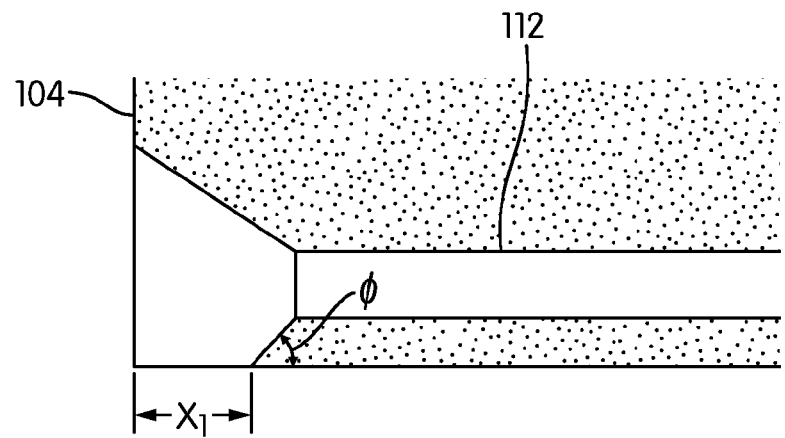
FIG. 17E is a view of a flow buffer shown schematically according to an exemplary embodiment.
Figure 17F:
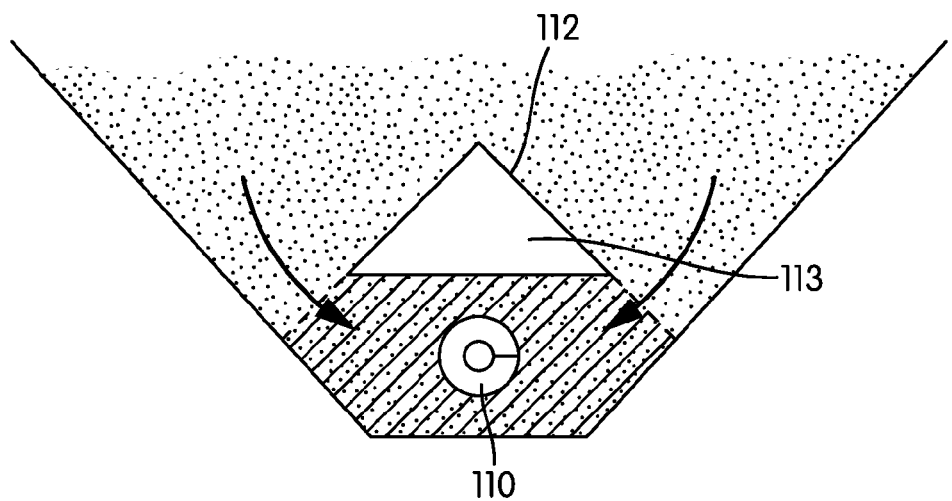
FIG. 17F is a view of an inverted v-shaped baffle shown schematically according to an exemplary embodiment.
Figure 18:
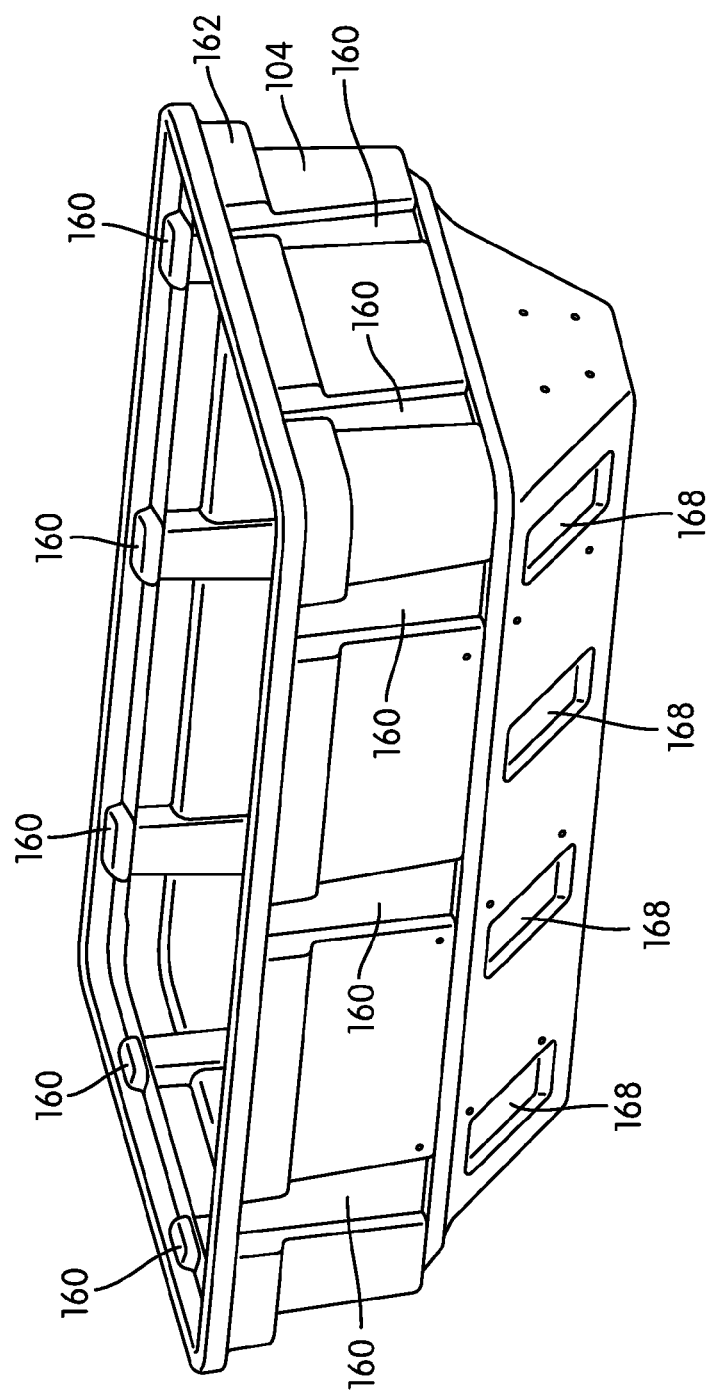
FIG. 18 is a perspective view of a hopper and trough according to an exemplary embodiment.
Figure 19A:
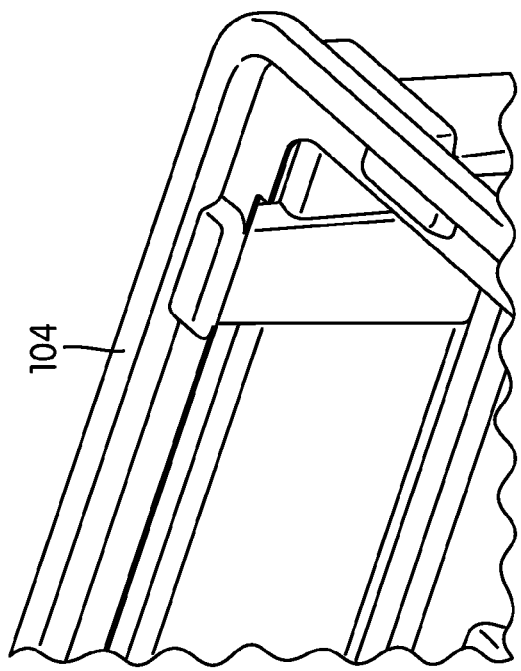
FIG. 19A is a view of a portion of a hopper according to an exemplary embodiment.
Figure 19:
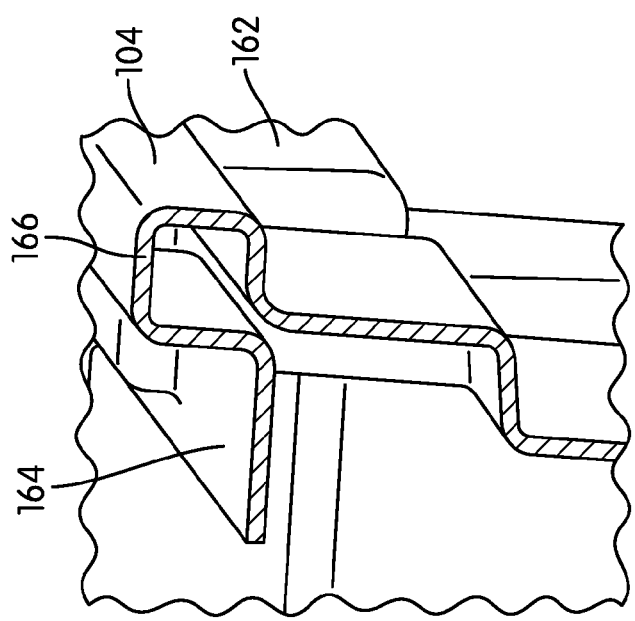
FIG. 19 is a cross-sectional view of a portion of a hopper shown schematically according to an exemplary embodiment.

Referring next to an embodiment shown in FIG. 17B, when the motive force conveying particulate material toward a ledge is stopped, the particulate material may continue to fall over the ledge until the face of the material forms an angle a with horizontal. With reference to the embodiments shown in FIGS. 17C-17E, the flow buffer 154 extends a distance from the ledge over which particulate material flows a distance X1. The distance X1 may be sufficiently large such that even with the face of particulate material forming the angle a with horizontal, the particulate material will stop short of the ledge, thus stopping the flow of particulate material when driving of the particulate material toward the ledge is discontinued. With reference to the embodiment shown in FIG. 17F, the inverted V-shaped baffle 112 provides a dead space 113 thereunder which may provide reduced pressure from the particulate material on the auger 110.

Referring now to the embodiment shown in FIGS. 18, 19, 19A, and 28, the hopper 104 is shown to include a plurality of strengthening features. The sidewall includes a plurality of inwardly extending pillar features 160 extending downwardly from a location proximate the upper end of the hopper 104 toward the trough 106. The sidewall also includes a discontinuously outwardly extending ring feature 162 proximate the open end of the sidewall. The ring feature 162 extends outwardly discontinuously, and it is interrupted by the pillar features 160.

The sidewall also includes a folded over end feature 164 extending inwardly from a generally tubular feature 166. The tubular feature 166 extends upwardly and forms the upper periphery of the sidewall. The tubular feature 166 may be a unitarily formed portion of the sidewall. The strengthening features may provide enhanced bulge resistance, rigidity, etc. to the hopper 104. The sides of the lower, angled portion of the hopper 104 include a plurality of inwardly extending strengthening features 168. In one embodiment, the strengthening features 168 provide resistance to bulging and increased stiffness.

Figure 20:
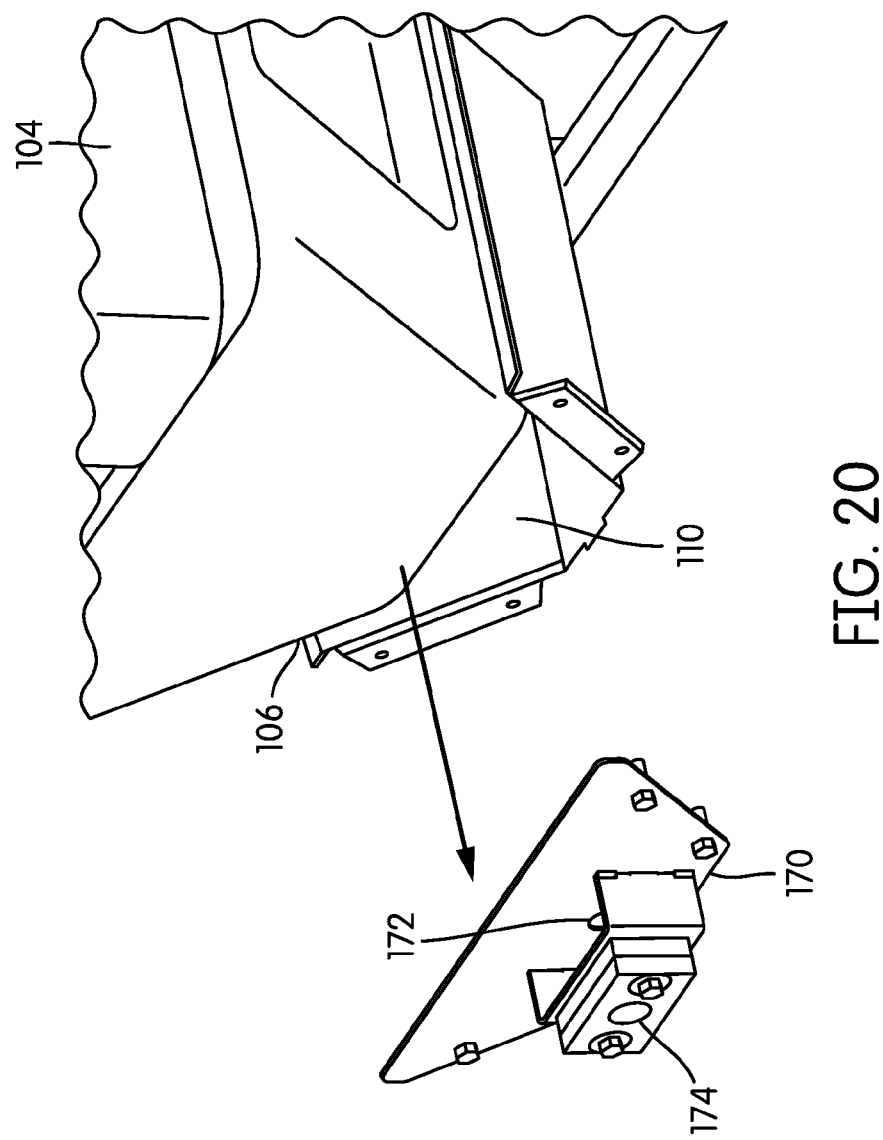
FIG. 20 is a perspective view of an end plate shown exploded from a trough according to an exemplary embodiment.
Figure 21:
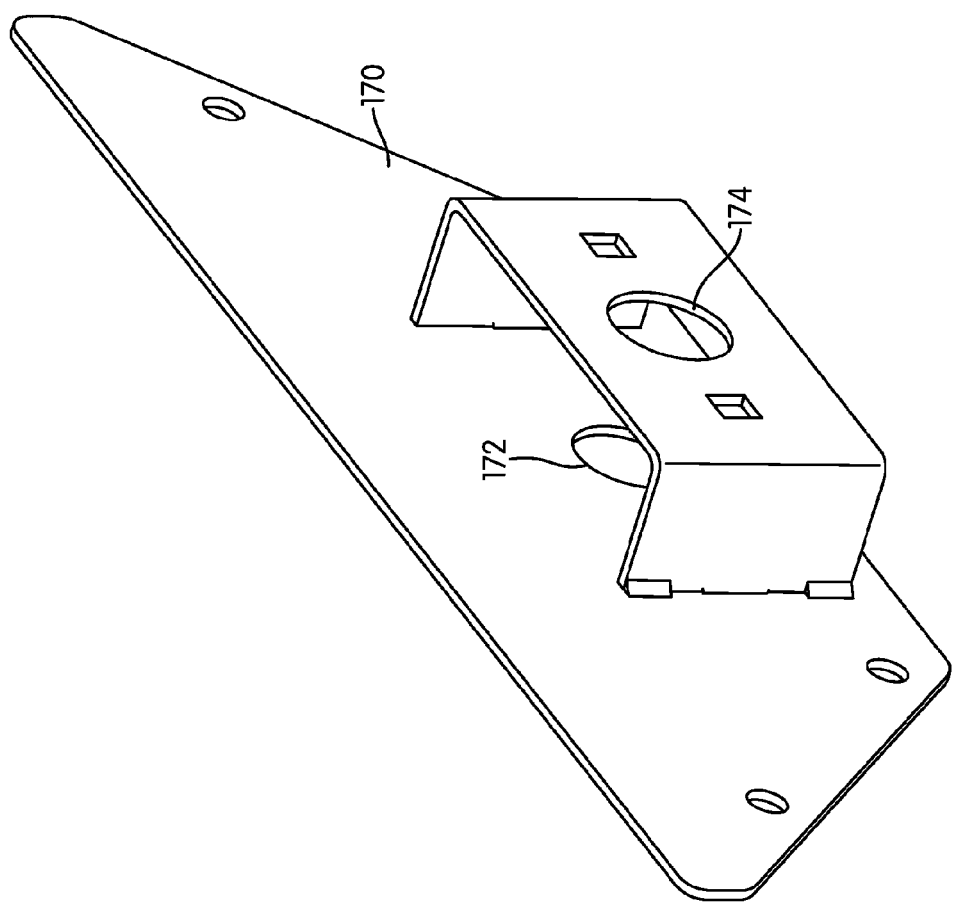
FIG. 21 is a perspective view of an end plate according to an exemplary embodiment.
Figure 22:
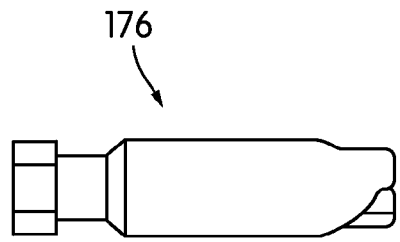
FIG. 22 is a side view of an auger relief tool according to an exemplary embodiment.
Figure 22A:
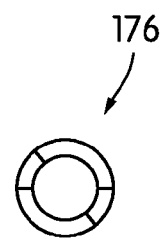
FIG. 22A is an end view of an auger relief tool according to an exemplary embodiment.
Figure 23:
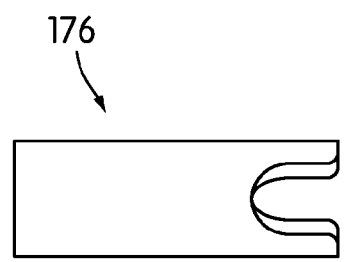
FIG. 23 is a side view of an auger relief tool according to an exemplary embodiment.

Referring next to the embodiment shown in FIGS. 20 and 21, a removable end plate 170 is shown that closes an opening located at the end of the trough 106. The end plate 170 may be coupled to the trough 106 by screws, bolts and nuts, or other appropriate hardware. An end of the auger 110 is rotatably supported in an aperture 172 located in the end plate 170 and is accessible from outside the spreader. At times particulate material may cause the auger 110 to jam, for example when the motor for rotating the auger 110 may not have sufficient power to overcome resistance of the particulate material to rotation of the auger 110. If this occurs, the end plate 170 may be temporarily removed from the trough 106. In this configuration, with the auger 110 uncoupled from the drive motor shaft, the auger 110 may be removed from the spreader 100 for maintenance, without requiring disassembly of the spreader 100 and removal of the inverted V-shaped baffle 112 to remove the auger 110 from the inside of the spreader 100. The auger 110 shaft rests on bearings (plastic bearings, self-lubricating bearings, etc.) through which an aperture 174 is defined.

Referring now to the embodiment shown in FIGS. 22-24D, when the auger 110 becomes overburdened with particulate material causing the torque required to turn the auger 110 to be in excess of what the motor system can generate, a coupler 176 may be inserted through the aperture 174 to access a hollow end of the auger 110 and rotated it with a wrench (such as a ratchet type wrench) to rotate the auger 110 to free up the auger 110 from the overburdening jam of the particulate material. The coupler 176 is preferably shaped and/or cammed such that it will disconnect from the auger shaft if the motor driving the auger 110 is turned on.

Figure 24:
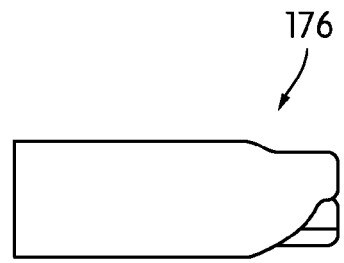
FIG. 24 is a side view of an auger relief tool according to an exemplary embodiment.
Figure 24A:
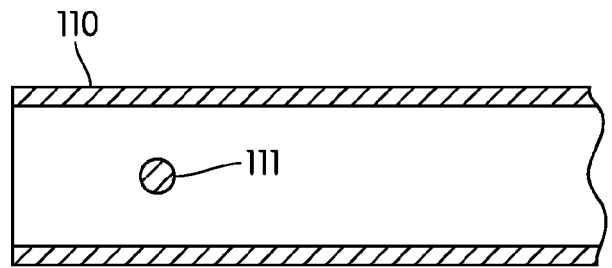
FIG. 24A is a cross-sectional view of a shaft of an auger shown schematically according to an exemplary embodiment.
Figure 24B:
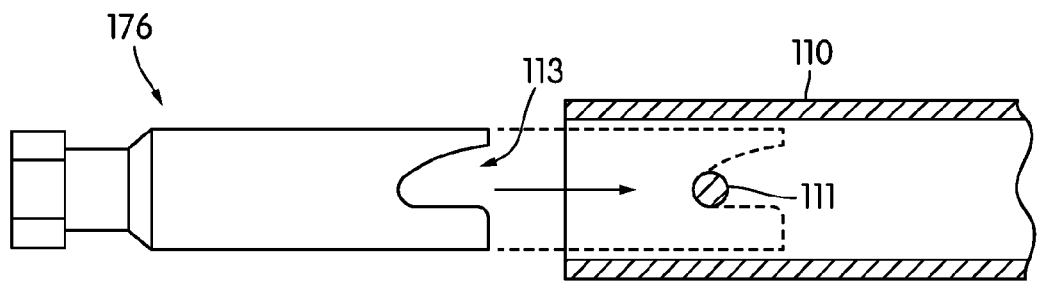
FIG. 24B is a cross-sectional view of a shaft of an auger and a relief tool shown schematically according to an exemplary embodiment.
Figure 24C:
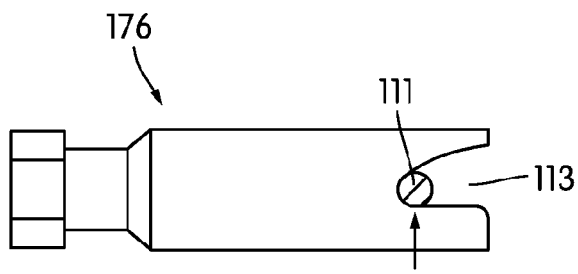
FIG. 24C is a schematic illustration of a relief tool engaging a cross-pin of an auger shaft according to an exemplary embodiment.
Figure 24D:
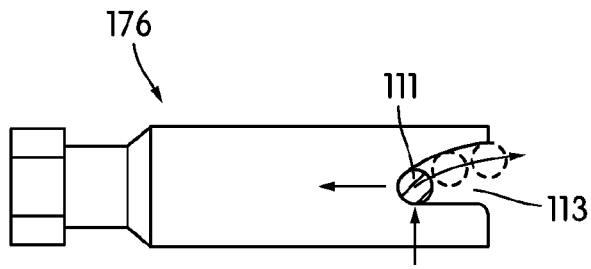
FIG. 24D is a schematic illustration of a relief tool disengaging from a cross-pin of an auger shaft according to an exemplary embodiment.

Referring particularly to FIGS. 24A and 24B, the auger 110 has a tubular shaft having a cross-pin 111 extending through the shaft. The coupler 176 defines a pocket 113 which receives the cross-pin 111 to allow the coupler to turn the auger 110. With reference to FIG. 24D, if the motor turns on and begins to rotate the auger 110 causing the cross-pin 111 to exert a force on the cammed surface of the coupler 176, the force exerted by the cross-pin 111 will cam the cross-pin out of the pocket 113. Thus, the coupler 176 acts as a one way cog: in one direction, the coupler 176 will engage the cross-pin 111, and in the other direction the coupler 176 is cammed outwardly out of engagement with the cross-pin 111. In another embodiment, the coupler will grab in one direction and slip in the opposite direction. In still another embodiment, the cross-pin of the auger 110 and the coupler 176 act together as a release mechanism.

In operation, the coupler 176 is inserted into the shaft of the auger 110 until the two slots in the coupler 176 line up with the cross-pin 111. The cross-pin 111 will rest in the end of the slots. When the coupler 176 is torqued in the proper direction, longitudinal edges of the slots of the coupler 176 are in the same plane as the axis of rotation, and therefore these edges of the coupler 176 push against the cross-pin 111 when the coupler 176 is rotated. If the auger 110 becomes powered by the motor and begins to rotate (which rotation is in same direction as the rotation of the coupler 176 to rotate the auger 110), the cross-pin will be driven onto the cammed edges of the slots of the coupler 176, the cammed edges of the slots of the coupler 176 will be driven to thrust the coupler 176 outwardly so that the slots in the coupler 176 are disconnected from engagement with the cross-pin 111 of the auger 110.

Figure 25:
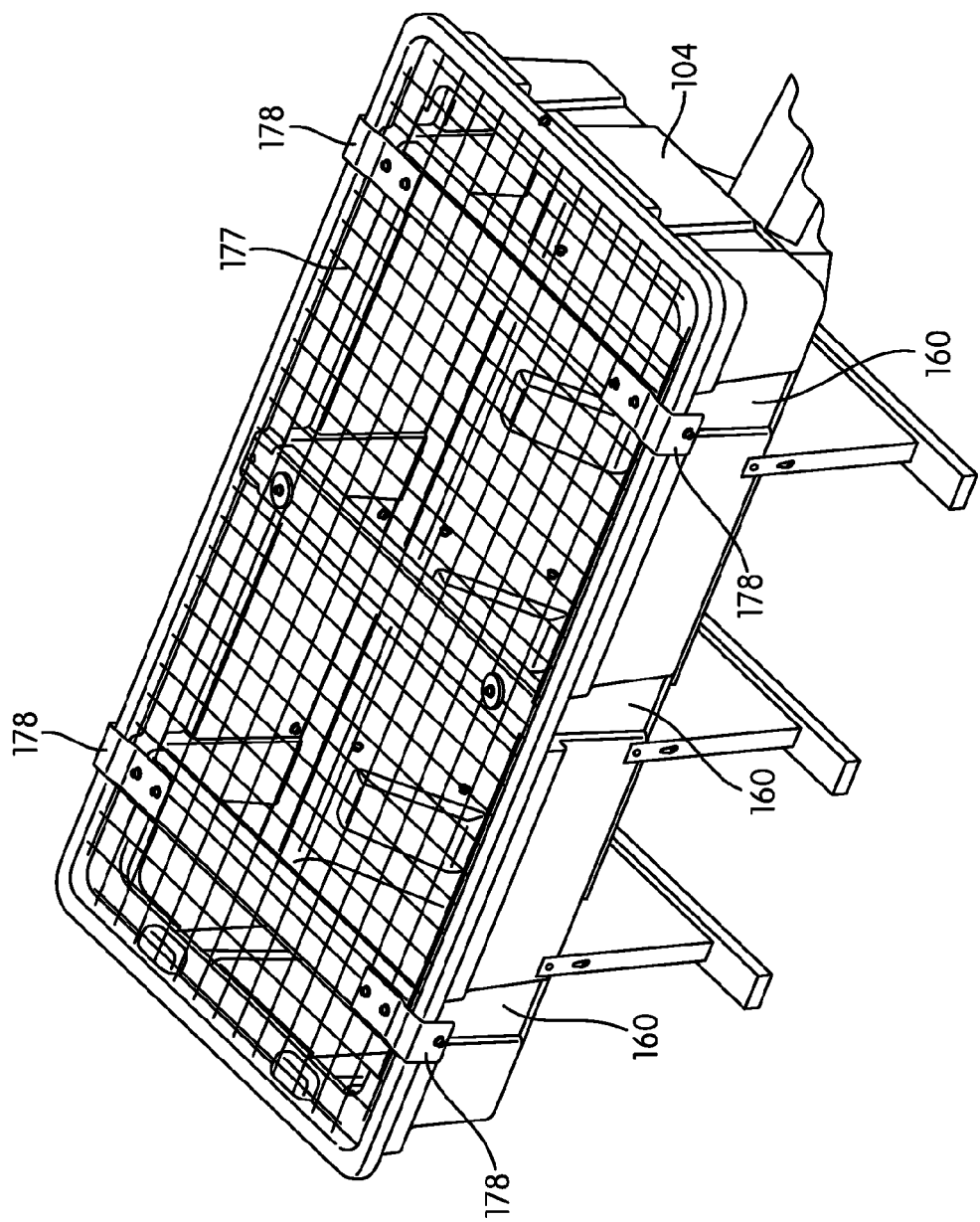
FIG. 25 is a perspective view of a spreader with the cover removed according to an exemplary embodiment.

Referring next to FIG. 25, a screen 177 is provided which extends across the top side of the hopper 104. A number of screen retainers 178 retain the screen 177 on the hopper 104 and are located over the pillar features 160 of the hopper 104. The screen retainers 178 also act as strap bracket retainers configured to transfer loads downwardly (e.g., a buckling load instead of an outwardly directed tensile loaded force).

Figure 26:
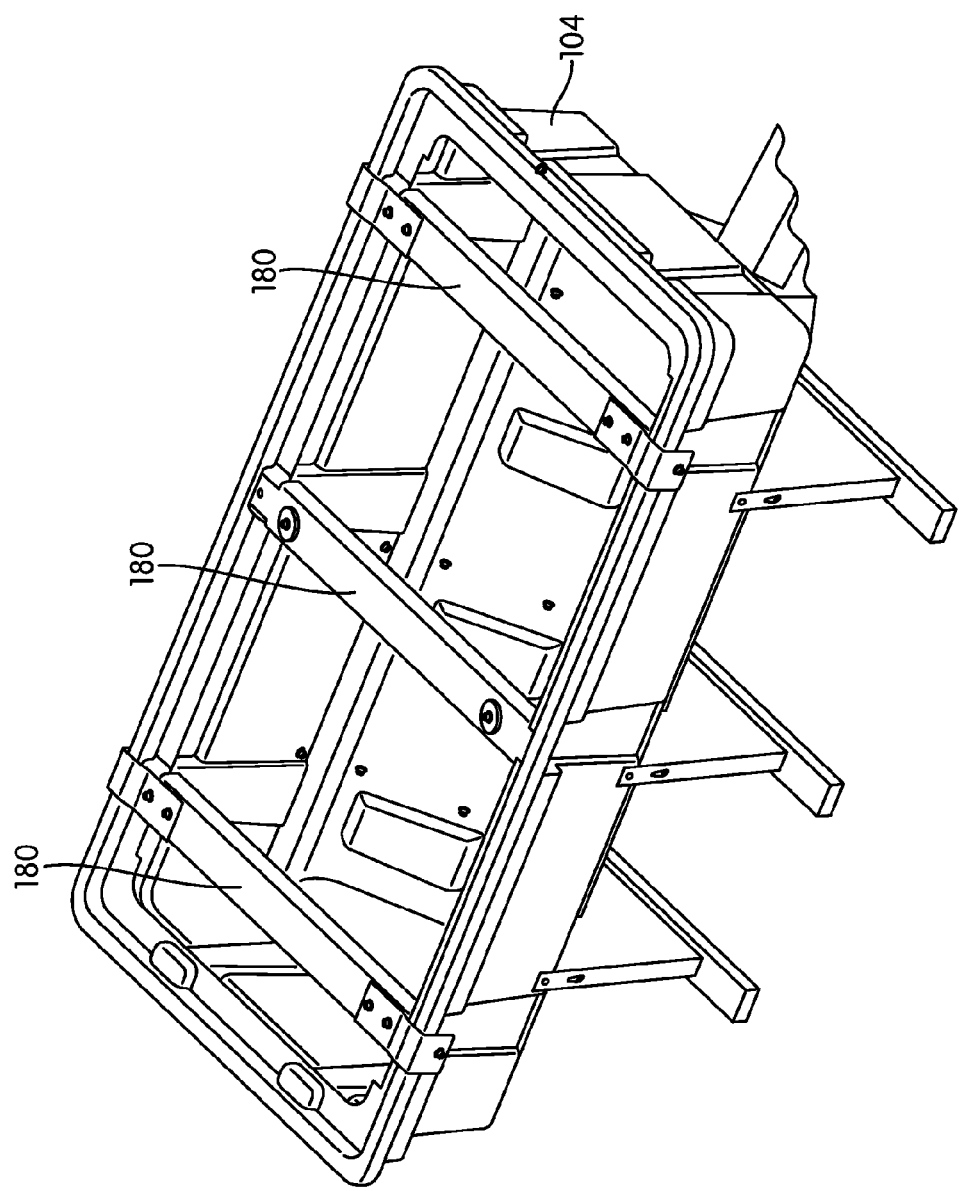
FIG. 26 is a perspective view of a hopper according to an exemplary embodiment.
Figure 27:
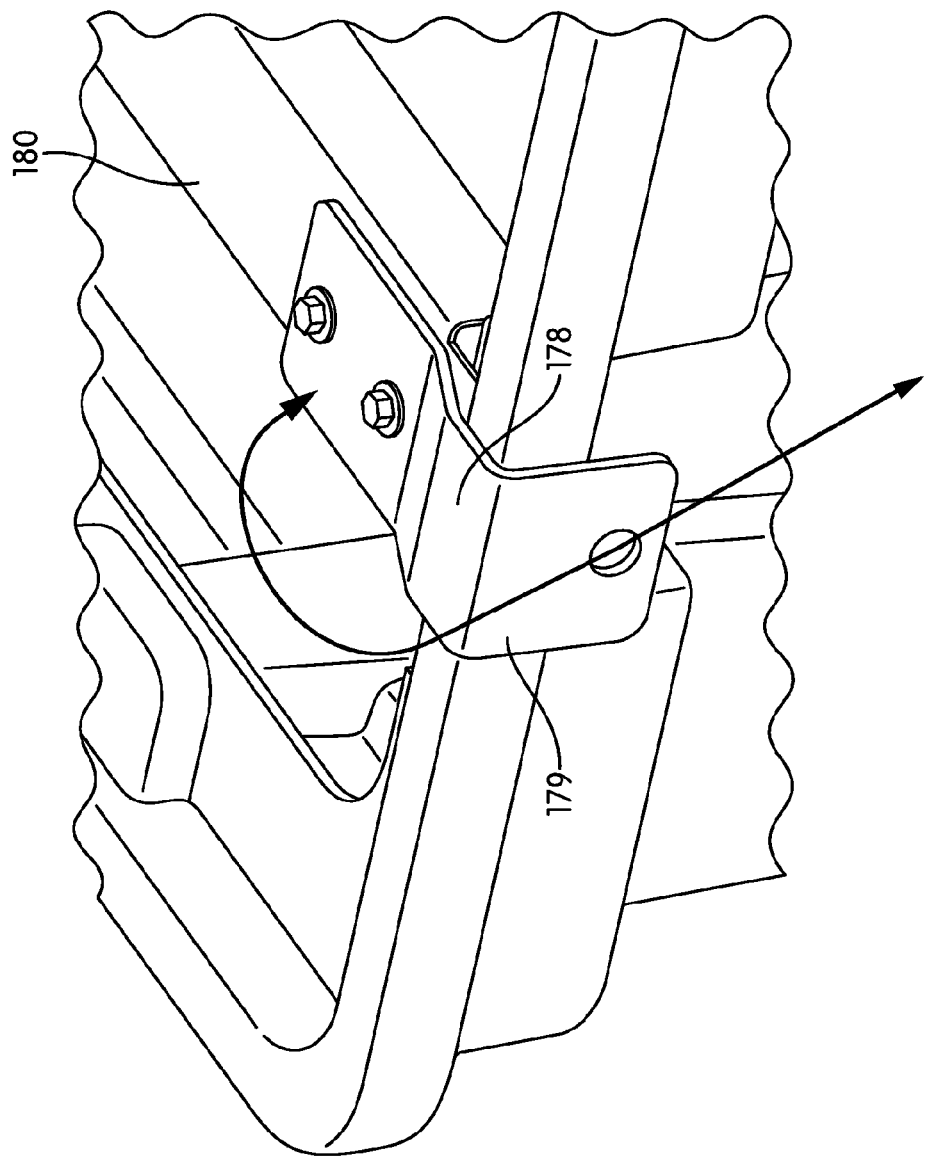
FIG. 27 is a view of a strap bracket retainer shown schematically according to an exemplary embodiment.

In FIGS. 26 and 27, which shows the screen retainers 178 with the screen 177 removed, horizontal supports 180 are shown. The horizontal supports 180 extend across the hopper 104 proximate the upper end of the sidewall of the hopper 104. The horizontal supports 180 are coupled to each side of the sidewall of the hopper 104 and resist outwardly directed forces pulling and/or deforming the sidewall outwardly and directing forces axially downwardly into the pillar features 160.

Figure 27A:
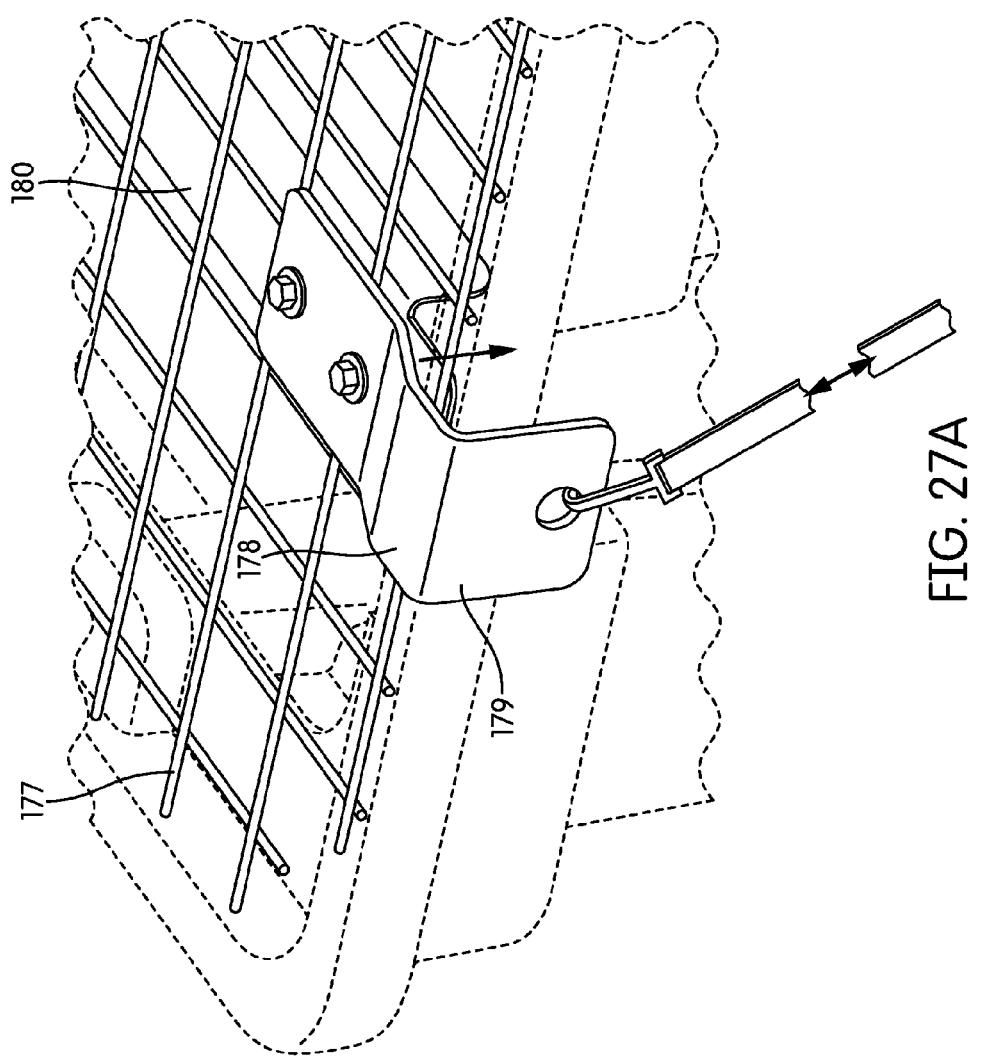
FIG. 27A is a view of a screen retainer and strap shown schematically according an exemplary embodiment.
Figure 27C:
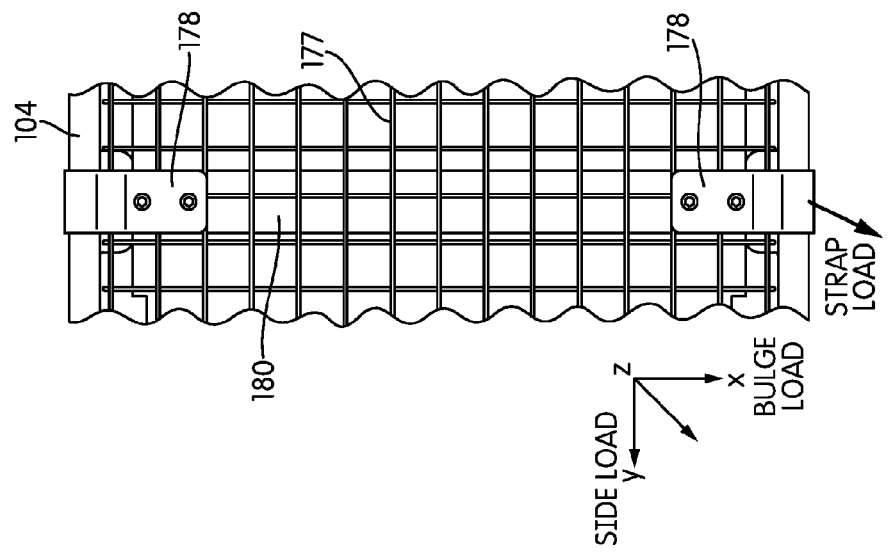
FIG. 27C is a top view of a crossbrace horizontal support, hopper and strap load shown schematically according to an exemplary embodiment.
Figure 27B:
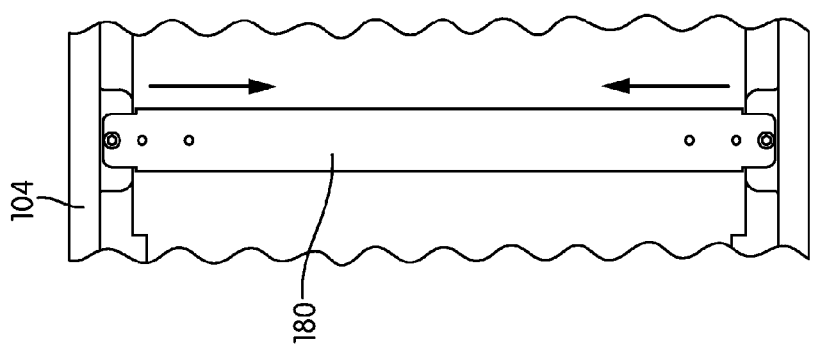
FIG. 27B is a top view of a crossbrace horizontal support and a hopper shown schematically according to an exemplary embodiment.
Figure 28:
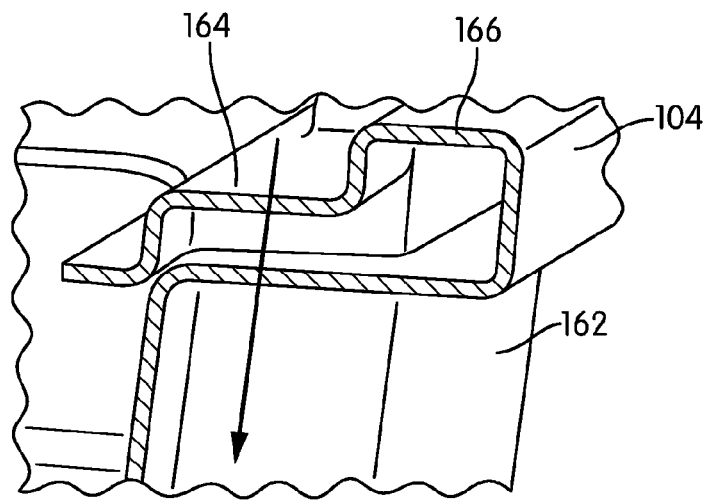
FIG. 28 is a cross-sectional view of a portion of a hopper shown schematically according to an exemplary embodiment.

Referring now to FIGS. 27A-27C, the screen retainers 178 hold the screen 177 in place between the screen retainers 178 and the horizontal supports 180. The screen retainers 178 include an outer downwardly extending portion 179 with an aperture through which a strap may be passed to couple the strap to the spreader. The screen retainers 178 include a first planar portion that retains the screen 177 and a second portion extending generally perpendicularly to the first planar portion extending down the side of the hopper 104.

The other end of the straps attached to the screen retainers 178 may be coupled to a vehicle carrying the spreader 100 to retain the spreader 100 in the bed of a truck (not shown). In the embodiment shown herein, four straps may be used to secure the spreader 100 to the vehicle bed. The configuration of the screen retainers 178 and the reinforced structure of the hopper 104 including the pillar features prevent the hopper from buckling and/or bending under the restraining loads of the straps. If desired, shock absorbers such as elastic plates, round rubber disks, etc., may be used to isolate vibration of the screen 177, which may be allowed to bounce on the center horizontal support 180 (shown in FIG. 26). The shock absorbers may reduce noise and wear on the screen 177 and the horizontal supports 180.

Figure 29:
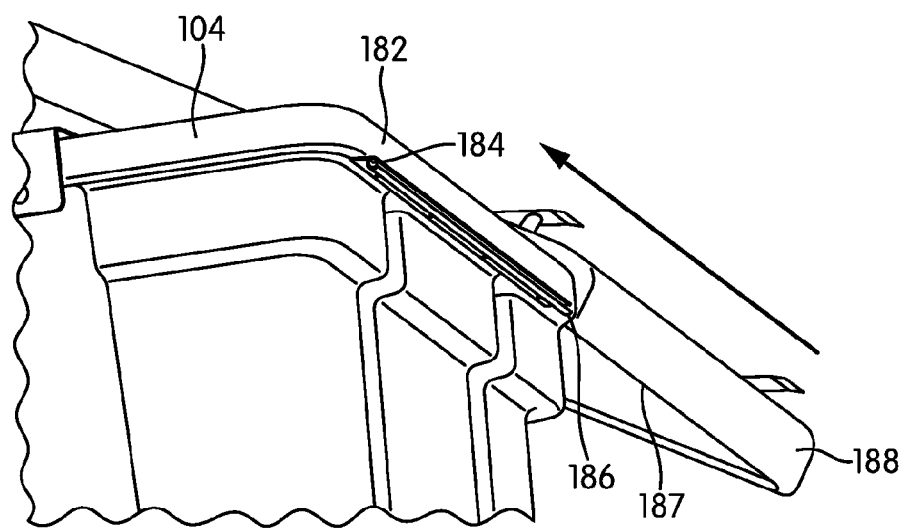
FIG. 29 illustrates a hopper with a retention feature according to an exemplary embodiment.
Figure 29A:
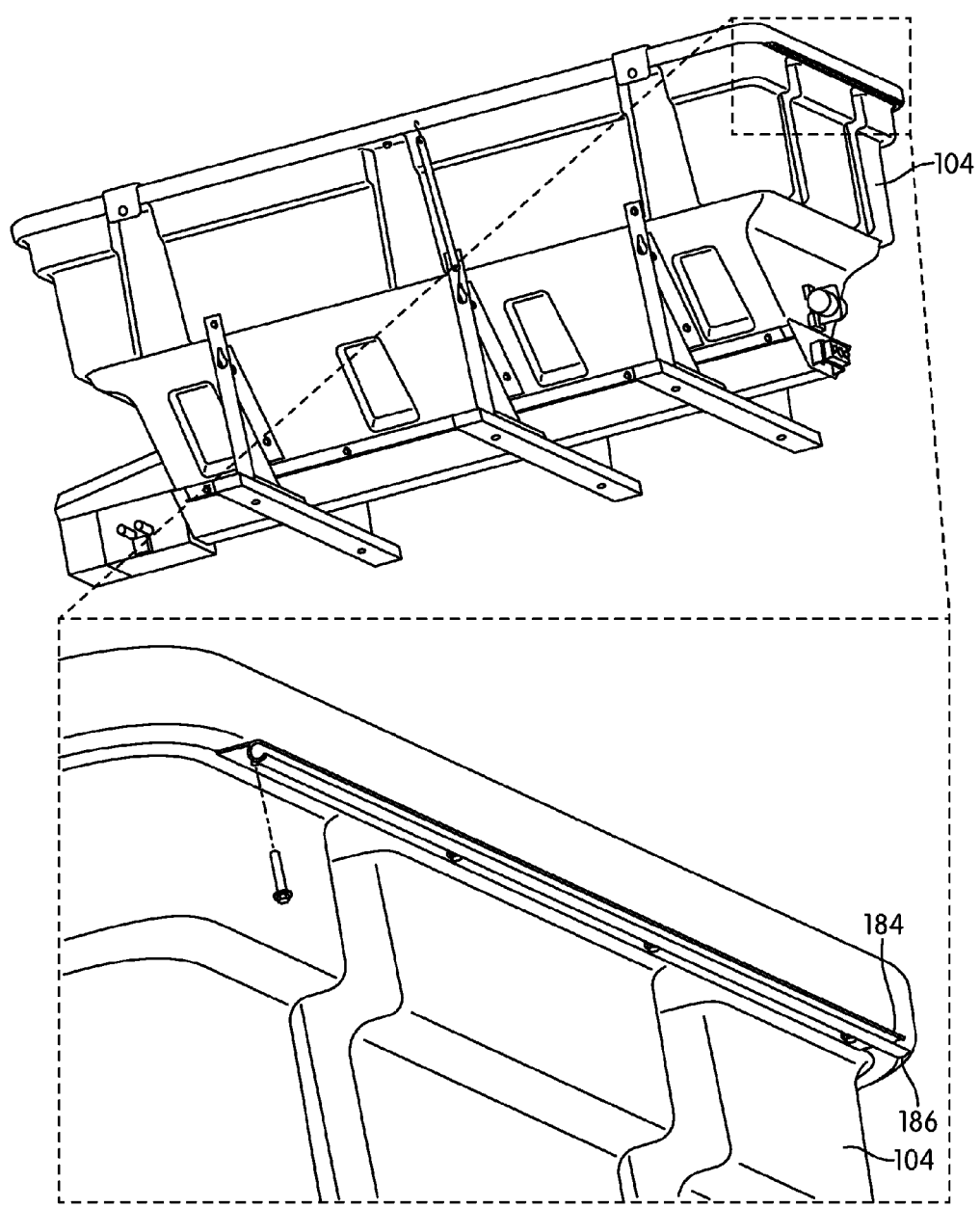
FIG. 29A is a detail view of the retention feature of FIG. 29 according to an exemplary embodiment.

Referring next to the embodiment shown in FIGS. 29 and 29A, a segment of the top edge of the hopper 104 is shown with an outwardly projecting upper lip 182. On the underside of the upper lip 182, the hopper 104 includes a channel 184. The channel 184 has an open end 186 through which a tubular structure 187 incorporated into a tarp 188 (also shown in FIG. 1) may be received to couple the tarp 188 to the hopper 104. Thus, the tarp 188 can be rolled and unrolled over the hopper 104 while the tarp 188 remains coupled to the hopper 104 to prevent the tarp 188 from becoming lost.

Figure 30:
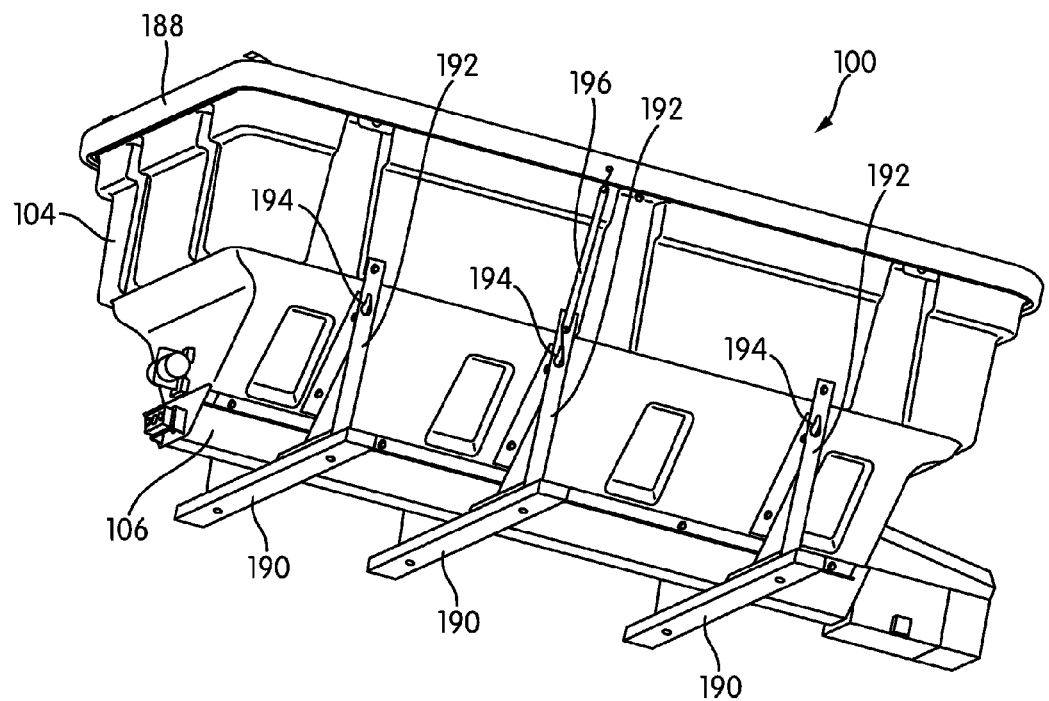
FIG. 30 is a perspective view of a spreader according to an exemplary embodiment.
Figure 31:
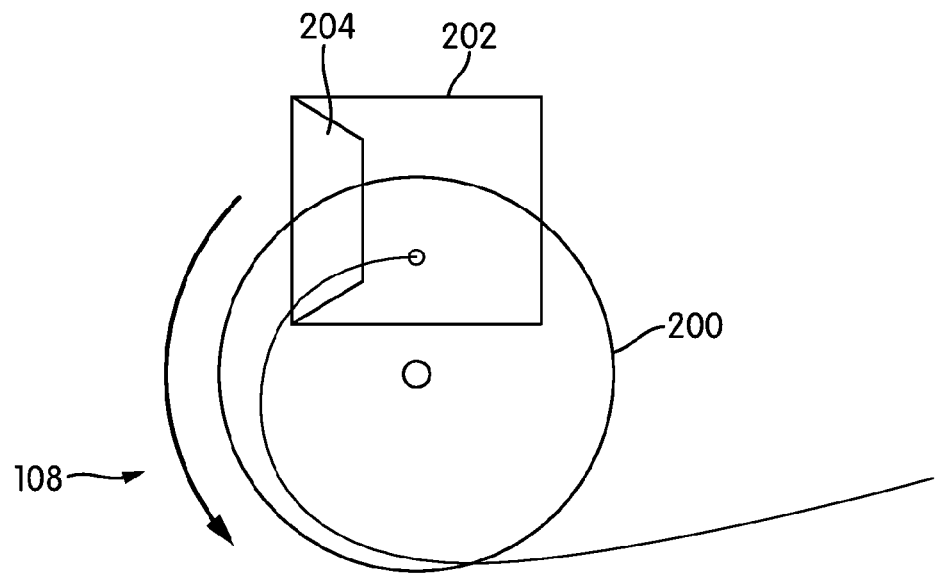
FIG. 31 is a top view of a portion of a spinner assembly shown schematically according to an exemplary embodiment.

Referring now to the embodiment shown in FIGS. 1 and 30, the spreader 100 may include a plurality of leg supports 190 under the spreader 100 which extend generally laterally with respect to the longitudinal axis of the auger 110 (not visible in FIG. 1 or 30). The spreader 100 also includes a plurality of legs 192 extending upwardly from the leg supports 190 to the hopper 104 and providing support for the hopper 104 against outwardly directed forces, buckling forces, etc. Located in the outer surface of the legs 192 are hook retention slots 194. A shock strap 196 coupled to the tarp 188 has an end hook that may engage the retention slot 194 to couple the tarp 188 to the hopper 104.

Referring for the moment to the embodiment shown in FIG. 3, it will be recalled that the spinner assembly 108 is located below the dispensing aperture and is configured to receive falling particulate material from the hopper 104. With reference to FIGS. 31-34, the spinner assembly 108 includes a spinner 200 located below a chute 202 configured to receive particulate material from the hopper 104 and direct the particulate material to the spinner 200. The chute 202 includes a baffle 204 extending angularly into the chute 202.

Figure 32:
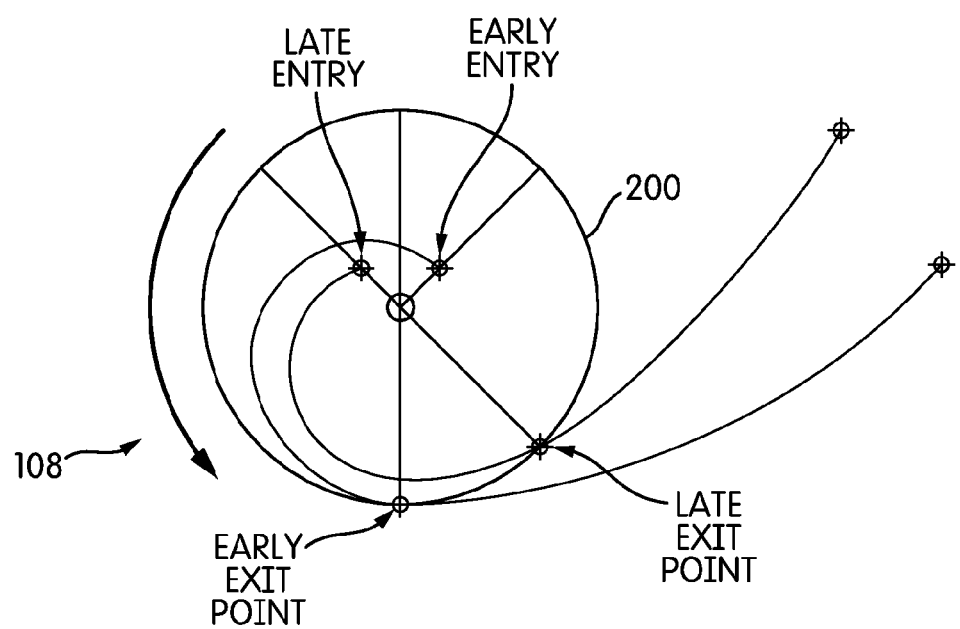
FIG. 32 is a top view of a portion of a spinner assembly showing travel paths of particulate material when a baffle is in a first configuration and a second configuration shown schematically according to an exemplary embodiment.
Figure 33:
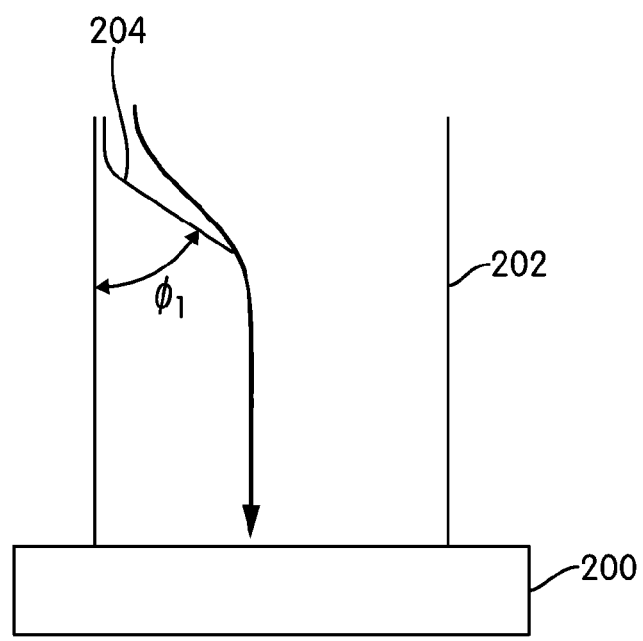
FIG. 33 is a view of a portion of a spinner assembly with a baffle in a first configuration shown schematically according to an exemplary embodiment.

Referring next to FIGS. 31 through 34, the spinner 200, the chute 202, and the baffle 204 are shown schematically with orientations having the front of a truck on which they are installed at the top of these figures and the back of the truck at the bottom of these figures. With the baffle 204 in a first configuration as shown in FIG. 33, forming an angle $\phi 1$ relative to vertical, more particulate material tends to be directed to an early entry location further to the right on the spinner 200 (as compared to FIGS. 31 and 34), i.e., more toward the passenger side of the truck carrying the spreader 100 (labelled as early entry in FIG. 32). While particulate material will be spread to the left, behind, and to the right of the spinner 200, with the baffle 204 in the first configuration a heavier distribution of particulate material tends to be released from the spinner 200 to the left than is released to the right.

Figure 34:
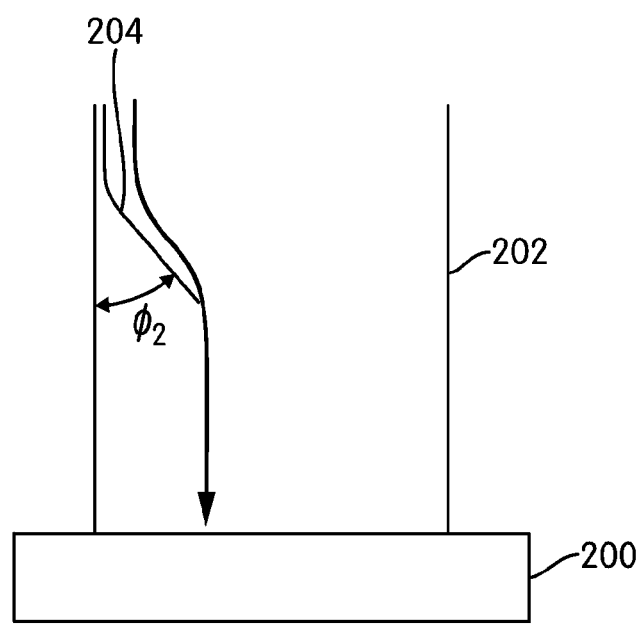
FIG. 34 is a view of a portion of a spinner assembly with a baffle in a second configuration shown schematically according to an exemplary embodiment.

In contrast, with the baffle 204 in a second configuration as shown in FIG. 34, forming an angle $\phi 2$ relative to vertical, which is less than angle $\phi 1$, more particulate material tends to be directed to a late entry location further to the left on the spinner 200 (as compared to FIGS. 31 and 34), i.e. more toward the driver side of the truck carrying the spreader 100 (labelled as late entry in FIG. 32). While particulate material will again be spread to the left, behind, and to the right of the spinner 200, with the baffle 204 in the second configuration a heavier distribution of particulate material tends to be released from the spinner 200 to the right than is released to the left.

For example, if the particulate material hits the spinner 200 at an earlier degree angle during the spinner rotation cycle, the material will leave the spinner sooner in the rotation cycle, dispelling a greater proportion of the material to the driver side. If, on the other hand, the material hits the spinner at a later degree angle during the spinner rotation cycle, the material will leave the spinner later in the rotation cycle, dispelling a greater proportion of the material to the passenger side. In a preferred embodiment, the angle of the baffle 204 relative to vertical may be adjusted to adjust spread pattern of particulate material.

Figure 35:
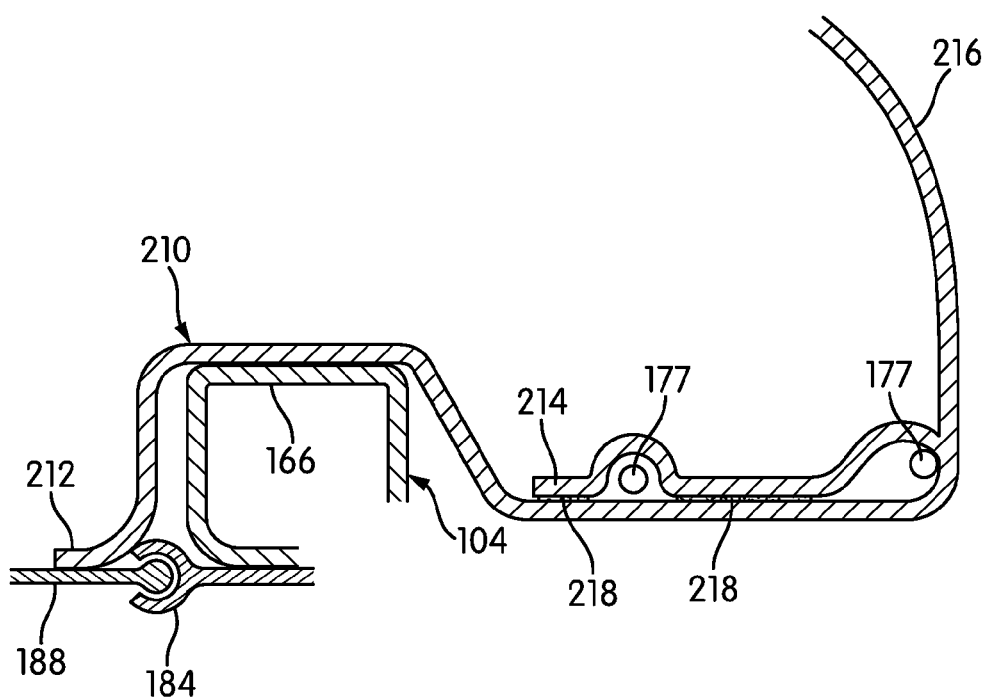
FIG. 35 is a cross-sectional view of a cover retention configuration shown schematically according to an exemplary embodiment.

Finally, with reference to the embodiment shown in FIG. 35, a Y-shaped strap 210 includes a lower leg 212 that is stitched onto the tarp 188 near the end retained in the channel 184. The lower leg 212 of the Y-shaped strap 210 extends over the generally tubular feature 166 of the hopper 104 and under two of the cross-members of the screen 177, and is connected to a first upper leg 214 and a second upper leg 216. The first upper leg 214 of the Y-shaped strap 210 wraps over the two cross-members of the screen 177, and is retained against a segment of the lower leg 212 of the Y-shaped strap 210 by hook-and-loop fasteners 218 (although snaps or any other suitable fasteners could instead be used). The second upper leg 214 of the Y-shaped strap 210 extends upwardly, and may be used to retain the tarp 188 in place on the edge of the screen 177 when the tarp 188 is rolled up for storage. The fastener is configured to deter the strap from falling through the screen and maintain the strap in an accessible location.

The hopper 104 may be formed from a plastic material such as polypropylene, high density polyethylene, PTE, or any other suitable material. The trough 106 may be formed from metal such as steel, or any other suitable material. The auger 110 may be operated by a 12 V DC Gear Motor, or any other suitable apparatus.

Figure 36:
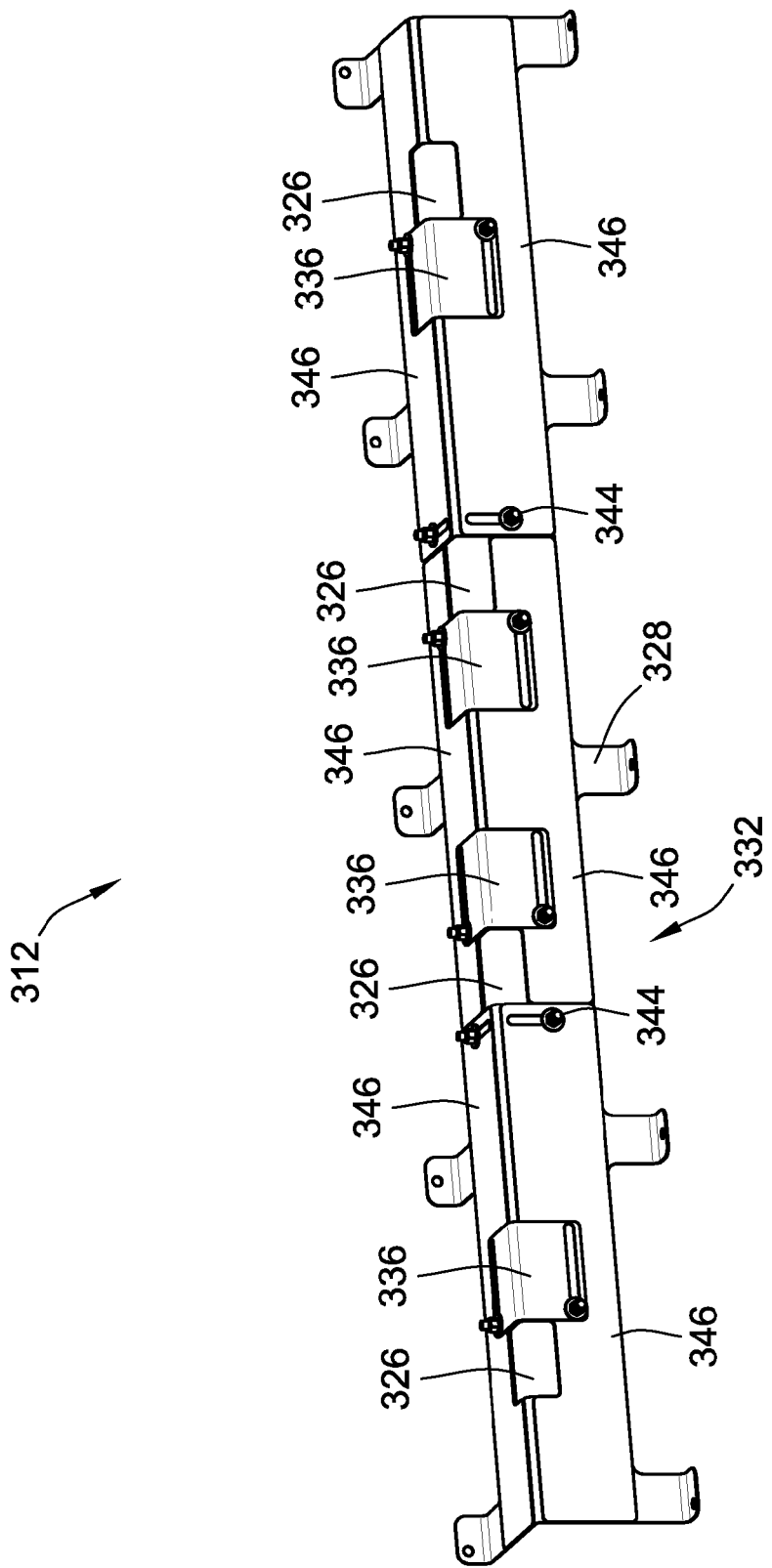
FIG. 36 is a perspective view of an inverted V-shaped baffle according to an exemplary embodiment in a first orientation.

FIG. 36 illustrates a further embodiment of a baffle assembly in the form of an inverted V-shaped baffle 312 for use in a spreader. The inverted V-shaped baffle 312 is similar in many aspects as inverted V-shaped baffle 112 described previously. All of the features and options discussed above with regard to inverted V-shaped baffle 112 are also applicable to the present inverted V-shaped baffle 312 unless directly contradictory to the particular features thereof.

This embodiment utilizes various flow regulation mechanisms similar to inverted V-shaped baffle 112 described above. More particularly, inverted V-shaped baffle 312 includes closure plates 336 that slide to selectively cover upper apertures 326. Further, inverted V-shaped baffle 312 includes side plates 346 to selectively close outer passages 332 formed between adjacent support legs 328. The closure plates 336 and side plates 346 operate substantially the same as closure plates 136 and side plates 146 described previously.

Figure 37:
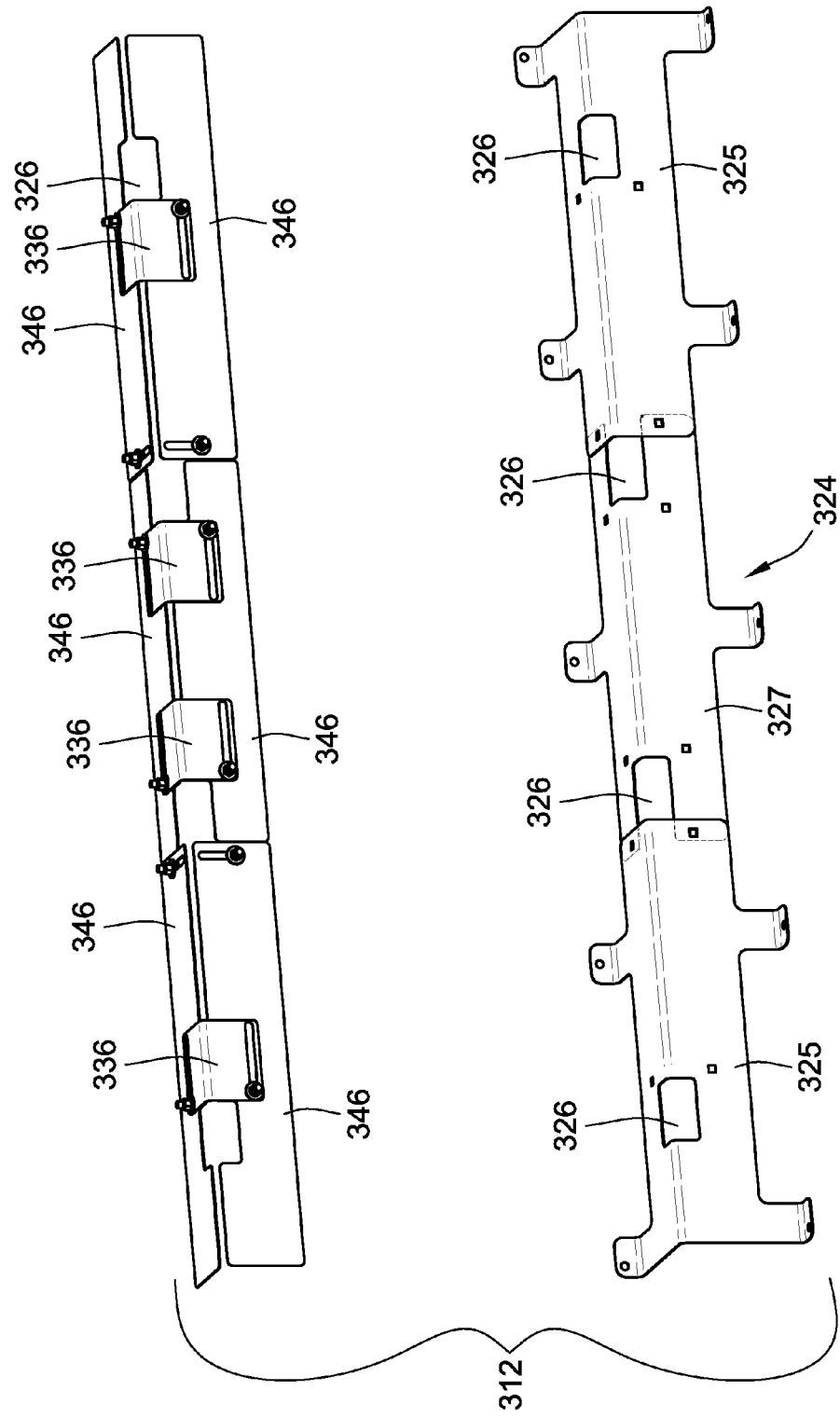
FIGS. 37 and 38 are partial exploded views of the inverted V-shaped baffle of FIG. 36.
Figure 38:
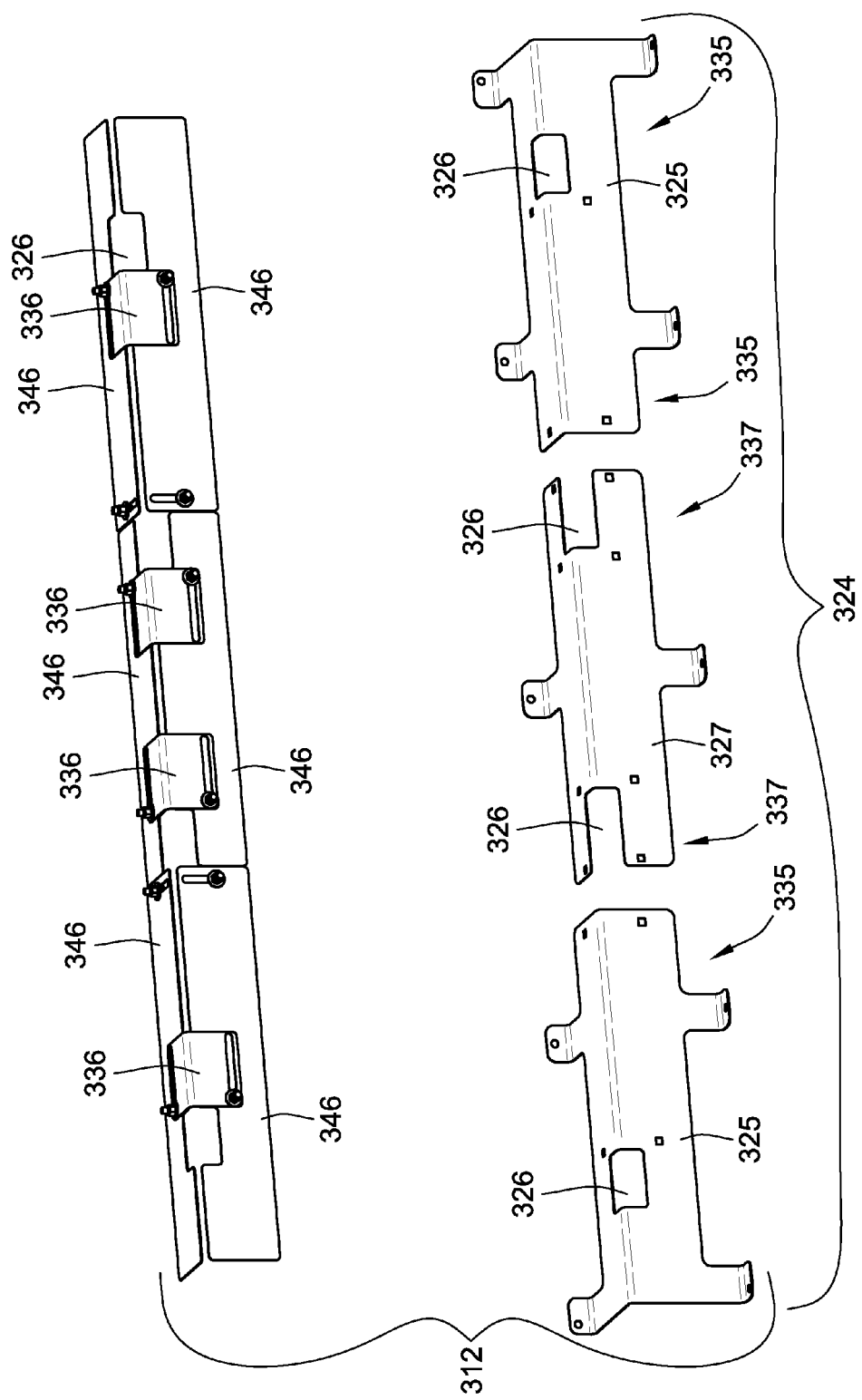

With reference to FIGS. 37 and 38, the inverted V-shaped baffle 312 includes a central v-plate 324. However, in this embodiment, the central V-plate 324 is formed from a plurality of V-plate segments 325, 327 that are generally axially aligned with one another in a direction generally parallel to the direction the auger 110 will carry the material out of the hopper 104/trough 106. More particularly, the central V-plate 324 includes a pair of end V-plate segments 325 and a central V-plate segment 327. The V-plate segments 325, 327 include support legs 328 for mounting the central V-plate 324 to the trough 106 or hopper 104 as discussed previously.

Figure 39:
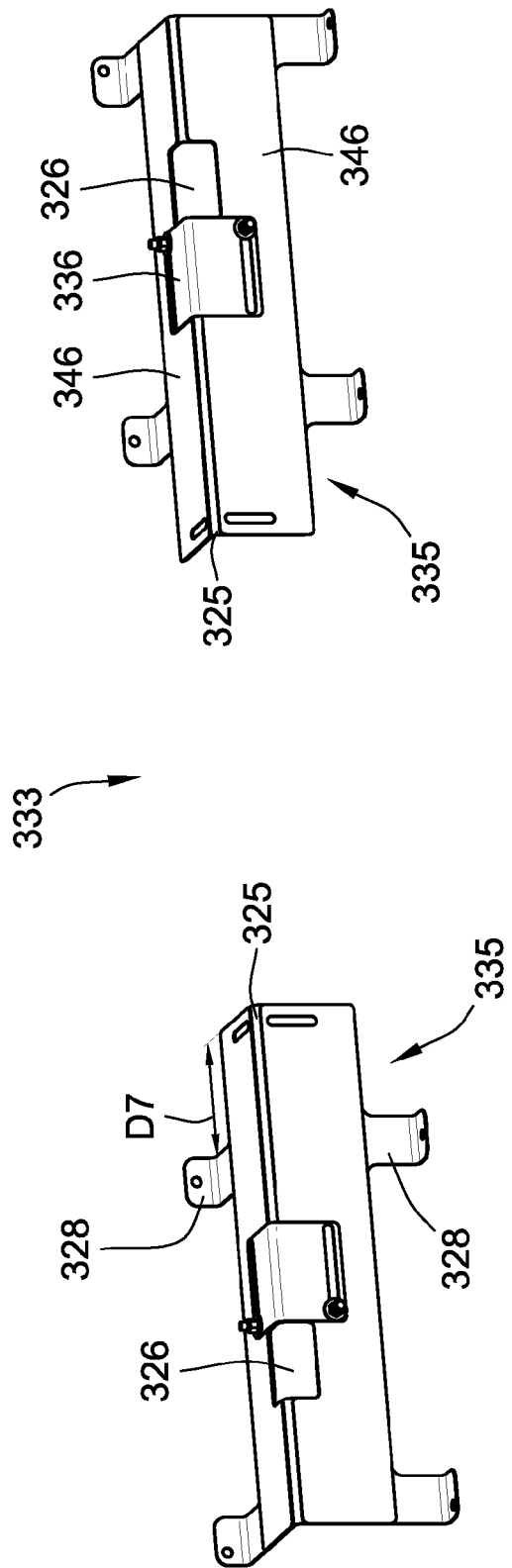
FIG. 39 is a perspective view of the inverted V-shaped baffle of FIG. 36 in an alternative orientation.

With additional reference to FIG. 39, a benefit of the use of multiple V-plate segments 325, 327 and particularly central V-plate segment 327 is that for difficult to flow materials such as materials with a high moisture content (e.g. wet sand) the central V-plate segment 327 can be removed entirely to provide an enlarged intermediate opening 333 formed between cantilevered end portions 335 of the end V-plate segments 325. The enlarged intermediate opening 333 is similar to apertures 326 in that it extends through the inverted V-shaped baffle 312, and at least through a top of the inverted V-shaped baffle 312. However, in this embodiment, the end V-plate segments 325 are independent from one another when the central V-plate segment 327 is removed, unlike prior embodiments where the central V-plate 124 is a single piece of material. In this embodiment, the inverted V-shaped baffle 312 does not include structure directly connect the pair of end V-plate segments 325 when the central V-plate segment 327 is removed. Instead, the rest of the hopper 104 is required to maintain the two components in a substantially fixed orientation relative to one another.

With reference to FIGS. 37 and 38, when installed, opposed cantilevered end portions 337 of the central V-plate segment 327 overlap with the cantilevered end portions 335 of the end V-plate segments 325. Apertures in the overlapped cantilevered end portions 335, 337 receive nut and bolt pairs 344 (see FIG. 336) that also operate to control the flow regulation mechanisms.

Thus, when the inverted V-shaped baffle 312 is mounted in a spreader, such as spreader 100 above, and the central V-plate segment 327 is removed as illustrated in FIG. 39, the auger 110 would be covered at one portion by a first end V-plate segment 325, uncovered at another portion proximate enlarged intermediate opening 333, and then covered again at another portion by a the second end V-plate segment 325. As such, due to intermediate opening 333, there is a section of the auger 110 that is fully uncovered by the inverted V-shaped baffle 312 axially between two portions of the auger 110 that are covered by the inverted V-shaped baffle 312.

As such, the inverted V-shaped baffle 312 is adjustable between different configurations. Namely, one with the central V-plate segment 327 present and another with the central V-plate segment 327 removed.

While only three V-plate segments 325, 327 are illustrated in this embodiment, more or less V-plate segments could be used in other embodiments.

Another benefit of removing central V-plate segment 327 is that it creates a larger flow opening to the auger 10 spaced away from the ends of the hopper 104 such that material is withdrawn near the middle of the hopper 104. This can help balance the weight distribution of material within the hopper as material is removed from the hopper 104. More particularly, rather than the standard pattern of emptying material from the front of the hopper 104 to the rear of the hopper 104, when the flow openings are more consistent from the front to the back, the large opening 333 will promote removal of material from the middle of the hopper 104 rather than the front to the rear. This can help maintain weight on the front wheels of the vehicle in certain hopper spreader systems.

A further benefit of the end V-plate segments 325 is the cantilevered end portions 335. When the central V-plate segment 327 is removed, the free ends of the cantilevered end portions 335 are not supported, e.g. by central V-plate segment 327. These independent portions of the central V-plate 324, e.g. cantilevered end portions 335, are thus allowed to vibrate more vigorously than when attached to central V-plate segment 327 or when the central V-plate 112 is a single member as illustrated above.

Preferably, the cantilevered end portions 335 extend a distance D1 from support legs 328 of at least 2 inches, more preferably at least 3 inches and even more preferably at least 4 inches. If the distance D1 is too short, then the cantilevered end portions 335 will not provide as much additional vibration. The additional vibration provided by these cantilevered end portions 335 significantly helps flow low flow materials or materials that easily bridge within hopper 104.

Preferably, each V-plate segment 325, 327 has its own flow regulation mechanisms such that when a segment 325, 327 is removed, the corresponding flow regulation mechanisms can easily be removed as well.

As illustrated in FIG. 38, each V-plate segment 325, 327 includes at least one upper aperture 326. However, not all V-plate segment 325, 327 needs to include upper apertures in all embodiments.

Figure 40:
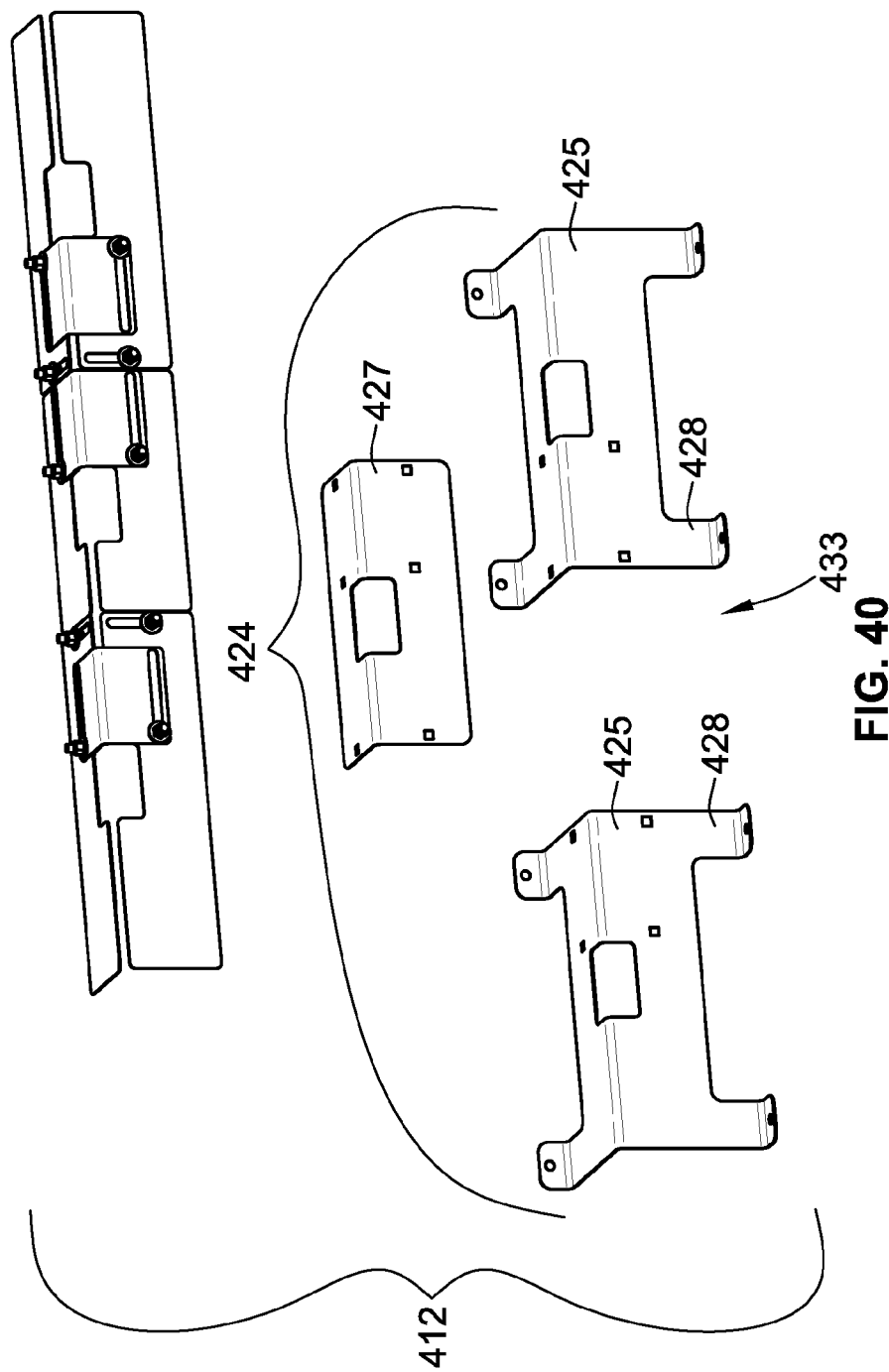
FIG. 40 is an exploded view of an inverted V-shaped baffle according to an exemplary embodiment.

FIG. 40 illustrates a further alternative of a baffle assembly in the form of an inverted V-shaped baffle 412 for use in a spreader. The central V-plate segment 427 of the central V-plate 424 is free of leg supports 428. Here, the central V-plate segment 427 is simply be supported by being attached to the end V-plate segments 425. Removal of central V-plate segment 427 again provides an enlarged intermediate opening 433 between end V-plate segments 425.

Figure 41:
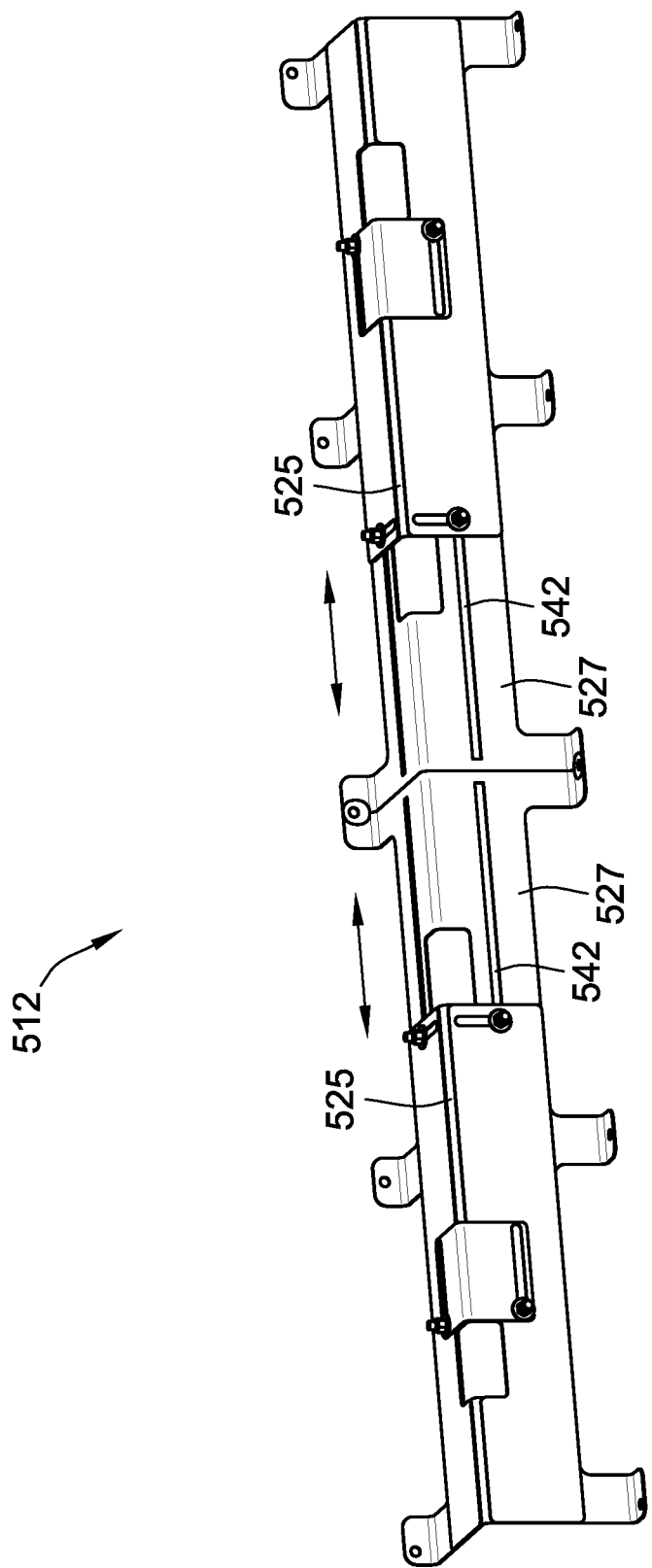
FIG. 41 is a perspective view of an inverted V-shaped baffle according to an exemplary embodiment.
Figure 42:
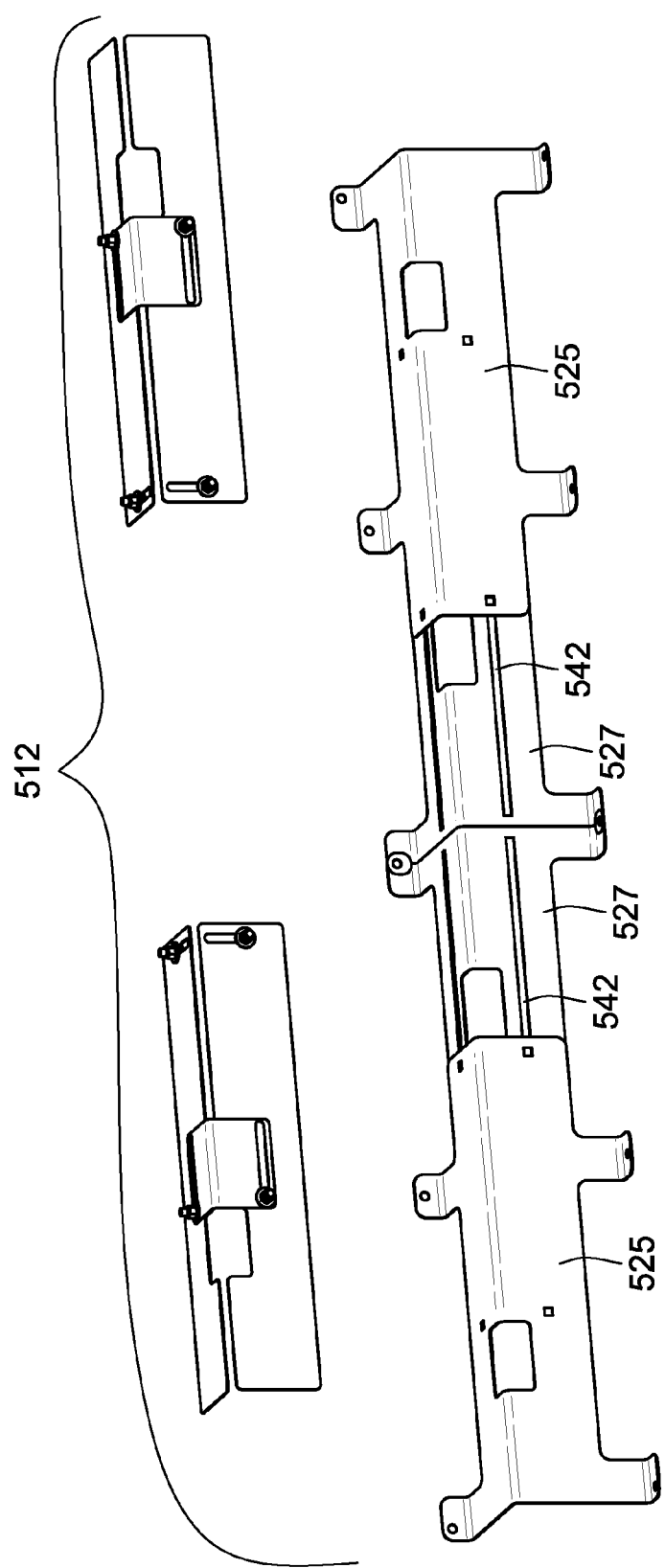
FIG. 42 is a partial exploded view of the inverted V-shaped baffle of FIG. 41 in a first orientation.

FIG. 41 illustrates a further alternative of a baffle assembly in the form of an inverted V-shaped baffle 512 for use in a spreader. The inverted V-shaped baffle 512 includes a pair of sliding central V-plate segments 527 located between end V-plate segments 525. The pair of sliding central V-plate segments 527 include slotted tracks 542 that allow the position of the sliding central V-plate segments 527 to be selectively adjusted to provide for varying sizes for an intermediate opening 533 (see FIG. 43) by sliding the individual sliding central V-plate segments 527 (e.g. parallel to the arrows in FIG. 41).

Figure 43:
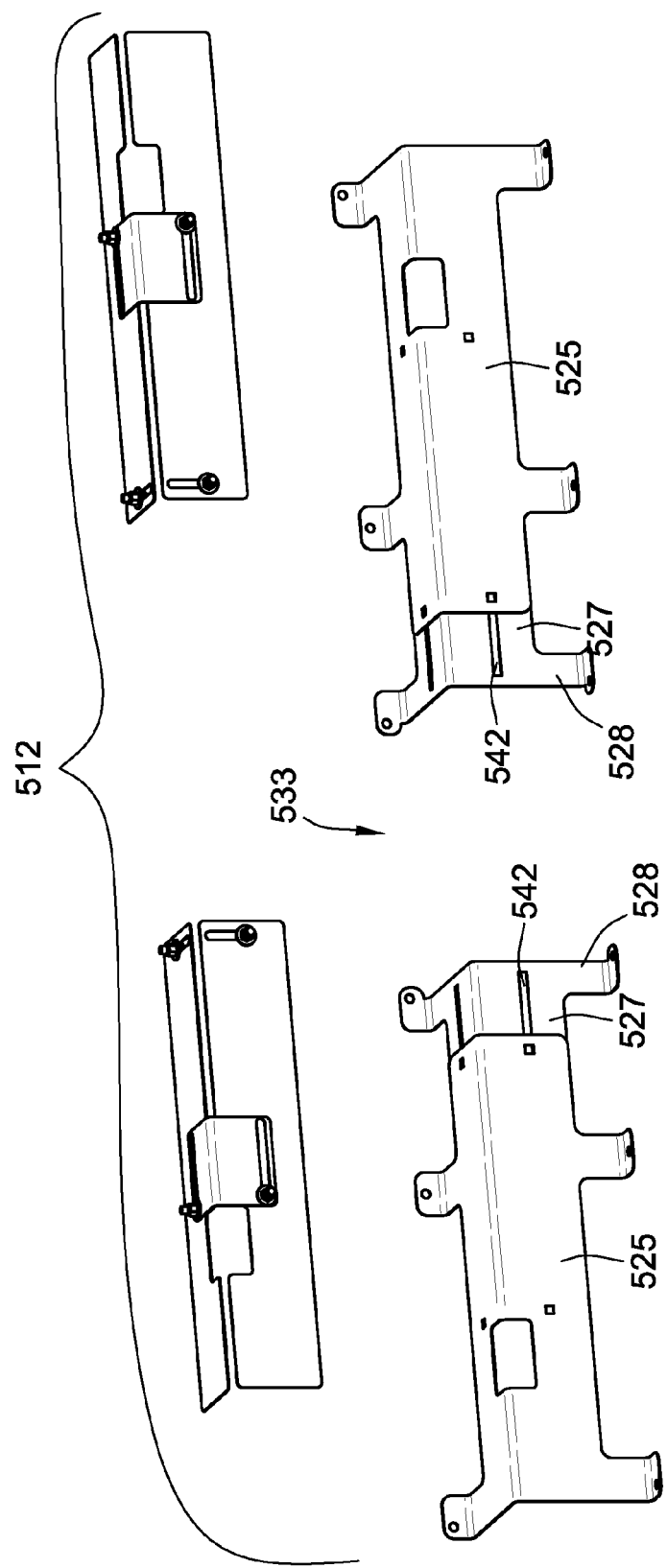
FIG. 43 is partial exploded view of the inverted V-shaped baffle of FIG. 41 in a second orientation.

When in the retracted position illustrated in FIG. 43, the support legs 528 of the sliding central V-plate segments 427 are not affixed to the hopper 104 or the trough 106. However, the upturned ends would simply rest against the hopper 104 or trough 106. Because the support legs 528 are not rigidly affixed, improved vibration of the sliding central V-plate segments 527 as well as the cantilevered end portions of the end V-plate segments 525 similar to as discussed above is permitted. However, the use of the sliding central V-plate segments 527 allows for selectively adjusting the size of the intermediate opening 522. This can be beneficial when the size of the intermediate opening 522 needs to be tailored for specific material flow characteristics. For instance, if it is determined that too much material is flowing to the auger 110 and overloading/jamming the auger 110, the operator can move the sliding central V-plate segments 527 toward one another to reduce the opening size. The sliding central V-plate segments 527 would be considered flow regulators.

Again, flow regulating mechanisms described for other embodiments can also be mounted to the end V-plate segments 525. While not illustrated, additional flow regulating mechanisms can extend over the sliding central V-plate segments 527.

It should be understood that the figures illustrate exemplary embodiments, and thus the present application is not limited to the details or methodology set forth in the description of an exemplary embodiment or illustrated in the figures. It should also be understood that the terminology is for the purpose of description only and should not be regarded as limiting.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A spreader configured to spread particulate material, the spreader comprising:
   a container configured to contain a quantity of dry, free flow particulate material, the container having an upper portion and a lower portion and being open on a top side of the upper portion, the container having a dispensing aperture located in the lower portion and one end thereof;
   a conveyor mechanism extending along a longitudinal axis in the lower portion of the container and extending adjacent the dispensing aperture;
   a baffle mounted in the lower portion of the container above the conveyor mechanism;
   a motor-driven spinner located near the dispensing aperture for receiving particulate material discharged from the container and spreading the particulate material over a distribution area; and
   a flow regulator configured to regulate flow of particulate material from the container above the baffle past the baffle to the conveyor mechanism, the flow regulator being adjustable from a first configuration in which a flow path past the baffle having a first area is provided and a second configuration in which a flow path past the baffle having a second area is provided, the second area being smaller than the first area, the flow regulator slidably mounted on and axially movable relative to the baffle parallel to the longitudinal axis to transition between the first and second configurations.

2. The spreader of claim 1, wherein the upper portion of the container comprises:

a hopper made of a plastic material, the hopper being open on a bottom side thereof; and wherein the lower portion of the container comprises:

a trough mounted onto the bottom side of the hopper and forming the lower portion of the container, the trough having the dispensing aperture located therein.

3. The spreader of claim 1, wherein the conveyor mechanism comprises:

a motor-driven auger extending along the longitudinal axis in the lower portion of the container and configured to convey particulate material to the dispensing aperture.

4. A spreader configured to spread particulate material, the spreader comprising:

a container configured to contain a quantity of dry, free flow particulate material, the container having an upper portion and a lower portion and being open on a top side of the upper portion, the container having a dispensing aperture located in the lower portion and one end thereof;

a conveyor mechanism extending along a longitudinal axis in the lower portion of the container and extending adjacent the dispensing aperture;

a baffle mounted in the lower portion of the container above the conveyor mechanism;

a motor-driven spinner located near the dispensing aperture for receiving particulate material discharged from the container and spreading the particulate material over a distribution area; and a flow regulator configured to regulate flow of particulate material from the container above the baffle past the baffle to the conveyor mechanism, the flow regulator being adjustable from a first configuration in which a flow path past the baffle having a first area is provided and a second configuration in which a flow path past the bathe having a second area is provided, the second area being smaller than the first area;

wherein the baffle includes:

an inverted V-shaped baffle member formed from a plurality of segments including a pair of end V-plate segments and a central V-plate segment interposed between the pair of end V-plate segments supported above the conveyor mechanism configured to prevent the weight of the particulate material in the container from weighing down the conveyor mechanism, the central V-plate segment being movable relative to the pair of end V-plate segments to provide an opening between the pair of end V-plate segments.

5. The spreader of claim 4, wherein the baffle further includes:

a plurality of support legs extending from bottom edges of the inverted V-shaped baffle member to support the inverted V-shaped baffle member in the lower portion of the container above the conveyor mechanism, wherein spaces located intermediate the support legs and below the inverted V-shaped baffle member allow particulate material to flow past the inverted V-shaped baffle member to the conveyor mechanism.

6. The spreader of claim 5, wherein each of the pair of end V-plate segments includes support legs extending from bottom edges thereof.

7. The spreader of claim 6, wherein the central V-plate segment does not include any support legs and is supported by the pair of end V-plate segments.

8. The spreader of claim 6, wherein the central V-plate segment is movable by being removable; and wherein each of the pair of end V-plate segments includes an unsupported, cantilevered end portion extending axially outward beyond a corresponding support leg thereof, the opening between the pair of end V-plate segments being defined between the cantilevered end portions when the central V-plate segment is removed.

9. The spreader of claim 5, wherein the central V-plate segment is movable by being removable; and wherein the pair of end V-plate segments are independent from one another and not connected together by components of the baffle when the central V-plate segment is removed.

10. The spreader of claim 4, wherein the central V-plate segment is movable by being removable; and wherein when the central V-plate segment is removed there is a portion of the conveyor mechanism that is completely uncovered by the baffle positioned axially between two portions of the conveyor mechanism that is covered by the baffle.

11. The spreader of claim 5, wherein the flow regulator comprises:

a pair of side plates moveably coupled to opposite sides of the V-shaped baffle member, the pair of side plates being adjustable between a first configuration in which they do not obstruct the spaces located intermediate the support legs and below the inverted V-shaped baffle member and a second position in which they at least partially obstruct the spaces located intermediate the support legs and below the inverted V-shaped baffle member to reduce the flow of particulate material through the spaces located intermediate the support legs and below the inverted V-shaped baffle member.

12. The spreader of claim 4, wherein the baffle comprises:

at least one aperture extending at least through the top of the inverted V-shaped baffle member; and at least one inverted V-shaped plate moveably positioned relative to the at least one aperture, the at least one inverted V-shaped plate being adjustable between a first configuration in which it does not obstruct the at least one aperture located on the top of the inverted V-shaped baffle member and a second position in which it obstructs the at least one aperture extending at least through the top of the inverted V-shaped baffle member to adjust the flow of particulate material through the at least one aperture extending at least through the top of the inverted V-shaped baffle member.

13. The spreader of claim 1, additionally comprising:

an adjustment control mechanism movable between a first configuration in which adjustment of the flow regulator is allowed and a second configuration in which adjustment of the flow regulator is prevented.

14. The spreader of claim 8, additionally comprising:

a vibrator configured to vibrate the baffle.

15. The spreader of claim 1, wherein the conveyor mechanism comprises:

a motor-driven auger.

16. The spreader of claim 15, wherein the auger has a first end driven by a motor assembly and a second end mounted in a bearing assembly and accessible from outside the container, wherein the spreader additionally comprises:

a coupler for engaging the second end of the auger to rotate the auger when particulate material has caused the auger to jam.

17. The spreader of claim 16, wherein the coupler and the second end of the auger are respectively configured to disconnect the coupler from the second end of the auger if the motor driving the auger is turned on.

18. A method of operating a spreader configured to spread particulate material, the method comprising:
- loading a quantity of dry, free flow particulate material into a container having an upper portion and a lower portion and being open on a top side of the upper portion, the container having a dispensing aperture located in the lower portion and one end thereof;
- operating a conveyor mechanism extending along a longitudinal axis in the lower portion of the container to convey particulate material to the dispensing aperture;
- preventing the weight of the particulate material in the container from jamming the conveyor mechanism with a baffle mounted in the lower portion of the container above the conveyor mechanism;
- receiving particulate material discharged from the container and spreading the particulate material over a distribution area with a motor-driven spinner located near the dispensing aperture; and
- regulating the flow of particulate material from the container above the baffle past the baffle to the conveyor mechanism with the baffle prior to loading, the baffle including an inverted V-shaped baffle member formed from a plurality of segments including a pair of end V-plate segments and at least one central V-plate segment interposed between the pair of end V-plate segments supported above the conveyor, wherein regulating the flow further includes moving the at least one central V-plate segment to provide an opening between the pair of end V-plate segments to increase flow to the conveyor.

19. The method of claim 18, wherein moving the at least one central V-plate segment includes removing the at least one central V-plate segment.

* * * * *

UNITED STATES PATENT AND TRADEMARK OFFICE
CERTIFICATE OF CORRECTION

PATENT NO. : 9,702,103 B2
APPLICATION NO. : 15/237442
DATED : July 11, 2017
INVENTOR(S) : Terry C. Wendorff et al.

Page 1 of 1

It is certified that error appears in the above-identified patent and that said Letters Patent is hereby corrected as shown below:

In the Claims

In Claim 4, Column 19, Line 37, the word "bathe" should correctly read --baffle--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*